United States Patent
Ogino et al.

(10) Patent No.: US 9,880,986 B2
(45) Date of Patent: Jan. 30, 2018

(54) INFORMATION DISPLAY APPARATUS, NON-TRANSITORY COMPUTER-READABLE STORAGE MEDIUM AND DISPLAY CONTROL METHOD

(71) Applicant: Konica Minolta, Inc., Tokyo (JP)

(72) Inventors: Shinya Ogino, Machida (JP); Kazuma Takeuchi, Hachioji (JP); Shunsuke Takamura, Tama (JP); Ikuko Kanazawa, Kunitachi (JP); Noriko Hoshino, Kokubunji (JP); Toshihiro Motoi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/304,231

(22) Filed: Jun. 13, 2014

(65) Prior Publication Data
US 2014/0375578 A1 Dec. 25, 2014

(30) Foreign Application Priority Data
Jun. 21, 2013 (JP) ................. 2013-130333

(51) Int. Cl.
*G06F 3/041* (2006.01)
*G06F 17/24* (2006.01)
(Continued)

(52) U.S. Cl.
CPC ............ *G06F 17/24* (2013.01); *G06F 3/0481* (2013.01); *G06F 17/227* (2013.01);
(Continued)

(58) Field of Classification Search
CPC .......................... G06F 17/2247; G06F 17/227
See application file for complete search history.

(56) References Cited

U.S. PATENT DOCUMENTS

| | | | |
|---|---|---|---|
| 8,751,921 B2 * | 6/2014 | Schormann | G06Q 10/10 715/203 |
| 2001/0020981 A1 * | 9/2001 | Jun | G06F 17/30843 348/426.1 |

(Continued)

FOREIGN PATENT DOCUMENTS

| JP | A-H07-200226 | 8/1995 |
|---|---|---|
| JP | 2005301492 | 10/2005 |
| JP | 4515463 | 7/2010 |

OTHER PUBLICATIONS

Office Action dated Jun. 2, 2015 from the corresponding Japanese application No. 2013-130333.
(Continued)

*Primary Examiner* — Priyank Shah
(74) *Attorney, Agent, or Firm* — Lucas & Mercanti, LLP

(57) ABSTRACT

Provided are an information display apparatus, a non-transitory computer-readable storage medium storing a display control program, and a display control method. An information display apparatus includes a display section configured to display an object thereon, an operation section configured to operate the object, and processing section configured to control the display section and the operation section. The processing section is configured to operate the display section to display a first screen showing the object and a second screen showing a screen transition diagram, into a display area of the display section. The screen transition diagram represents change in display of the first screen and shows first screen-transition and second screen-transition to be recognizable, where the first screen-transition represents change in display of the first screen, and the second screen-transition represents another change in display of the first screen starting at a certain point in the first screen-transition.

30 Claims, 19 Drawing Sheets

(51) Int. Cl.
*G06F 17/22* (2006.01)
*G06F 3/0481* (2013.01)

(52) U.S. Cl.
CPC ...... *G06F 17/2247* (2013.01); *G06F 17/2288* (2013.01); *G06F 2203/04803* (2013.01)

(56) References Cited

U.S. PATENT DOCUMENTS

2005/0226530 A1* 10/2005 Murayama .................. 382/276
2008/0034039 A1   2/2008 Cisler
2008/0046809 A1   2/2008 Oshima
2008/0133563 A1*  6/2008 Hironiwa ...................... 707/101

OTHER PUBLICATIONS

English translation of Office Action dated Jun. 2, 2015 from the corresponding Japanese application No. 2013-130333.
Office Action dated Dec. 9, 2016 from the corresponding Chinese Application No. 201410273021.0; Applicant: Konica Minolta, Inc.; English translation of Office Action; Total of 31 pages.
Office Action dated Jul. 18, 2017 from the corresponding European Application No. 14 173 290.9.
European Search Report dated Nov. 13, 2014 for the corresponding EP Patent Application No. EP14173290.

* cited by examiner

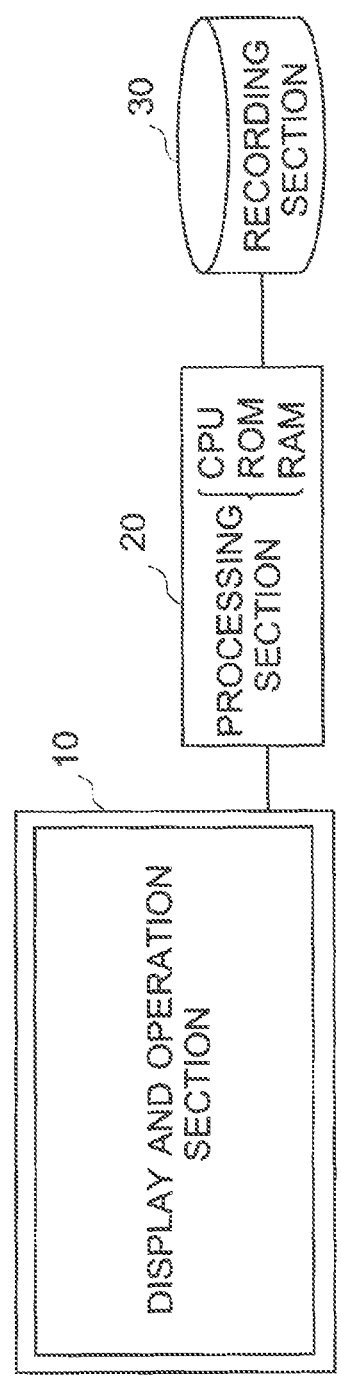

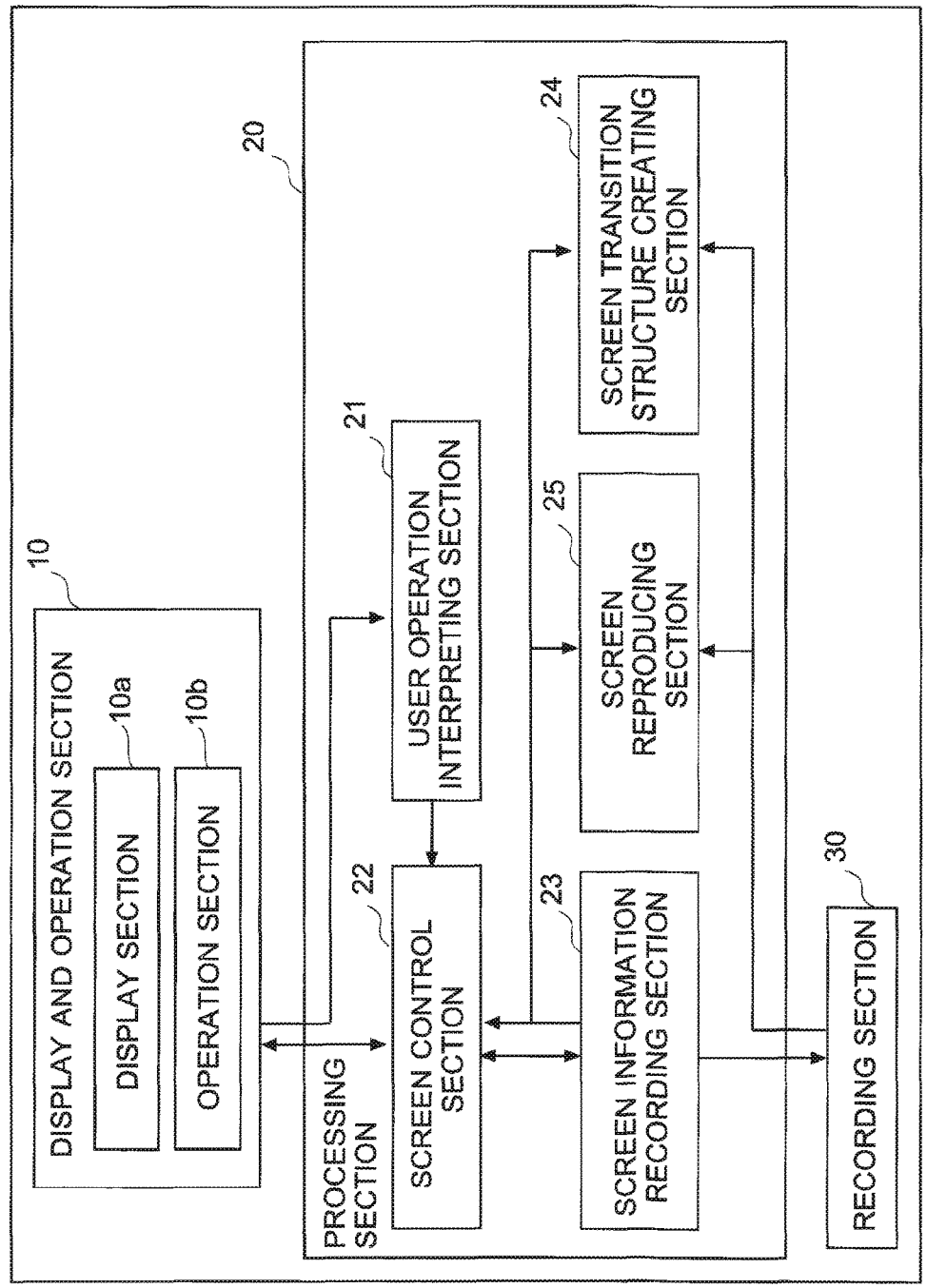

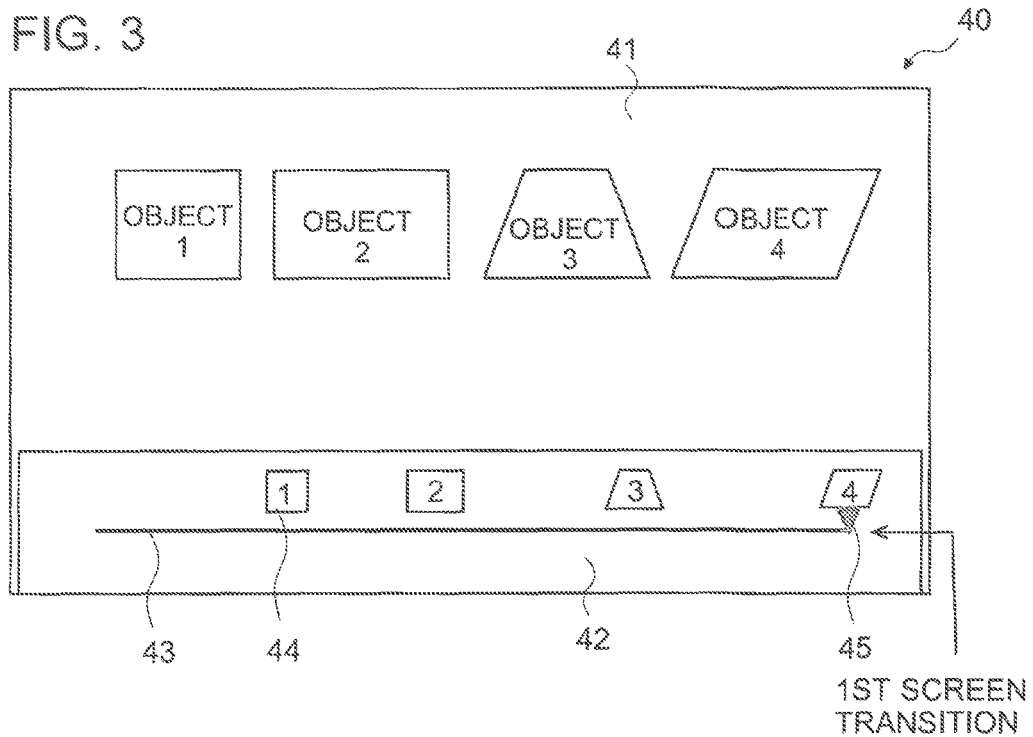
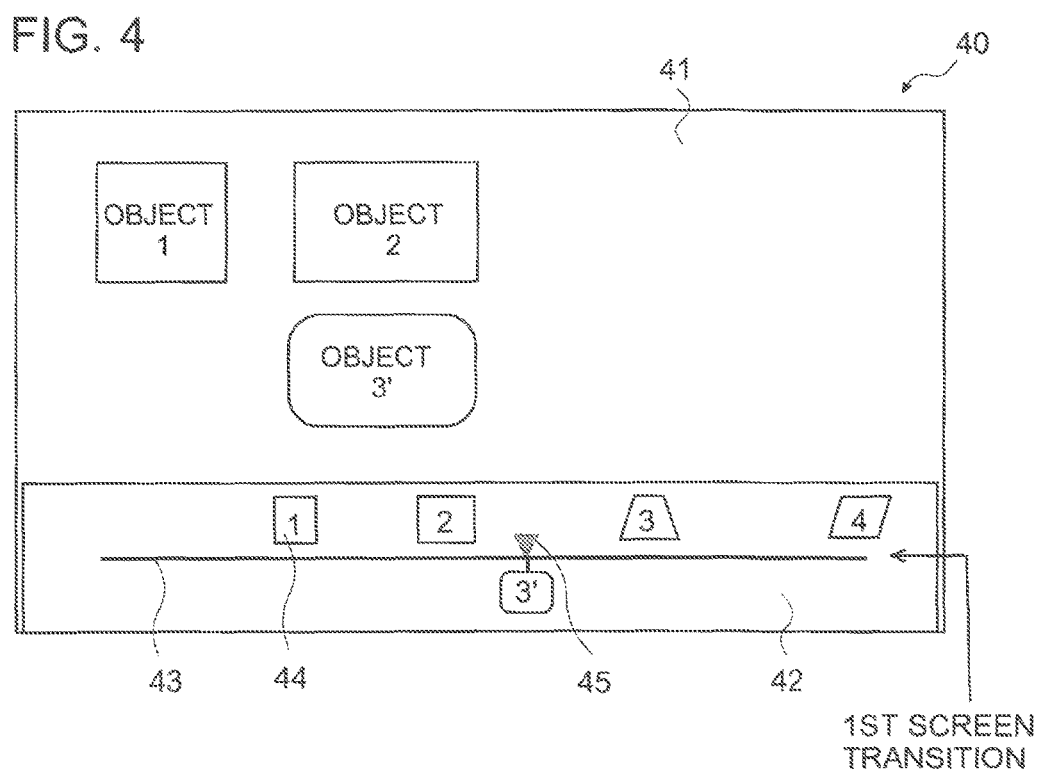

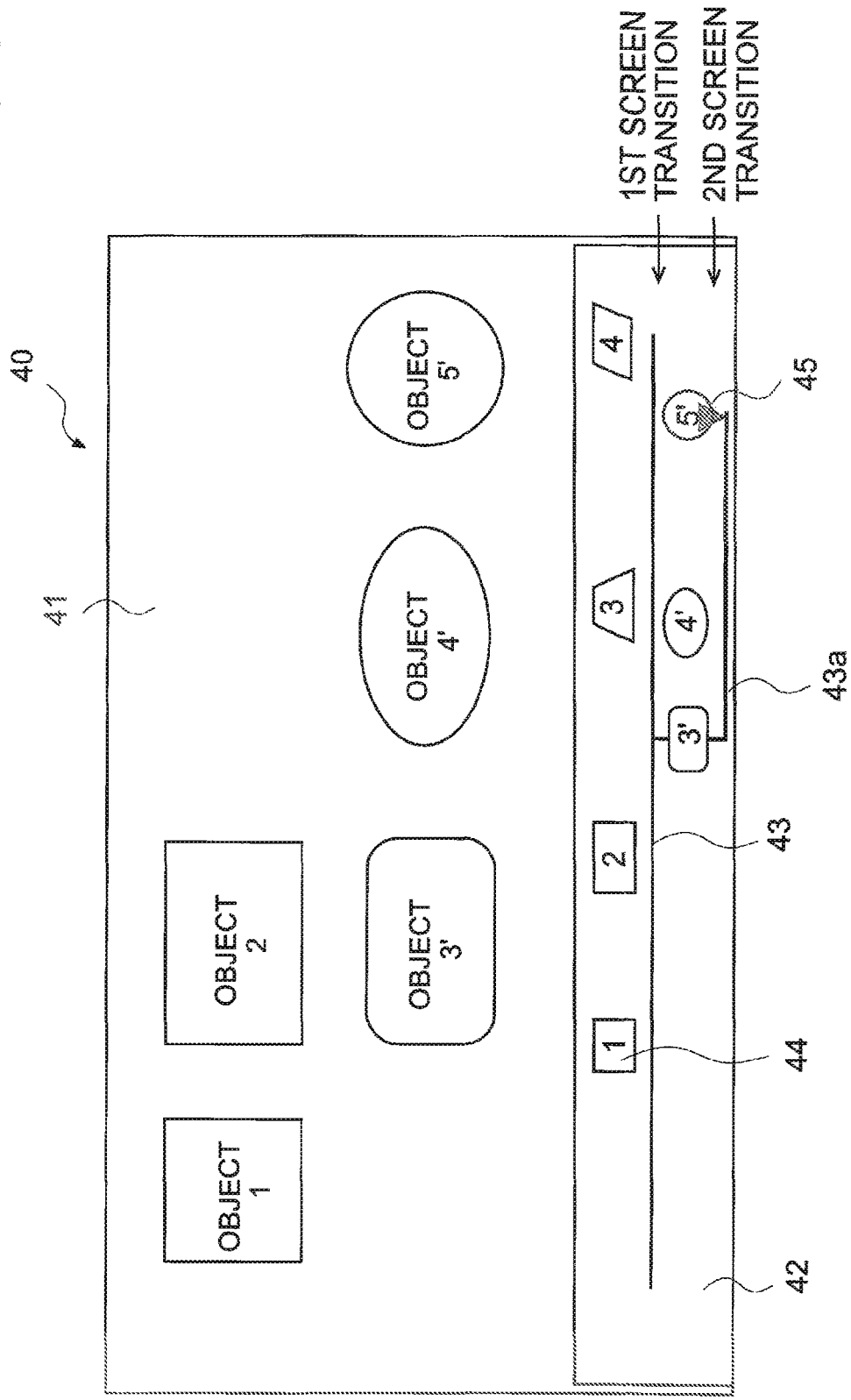

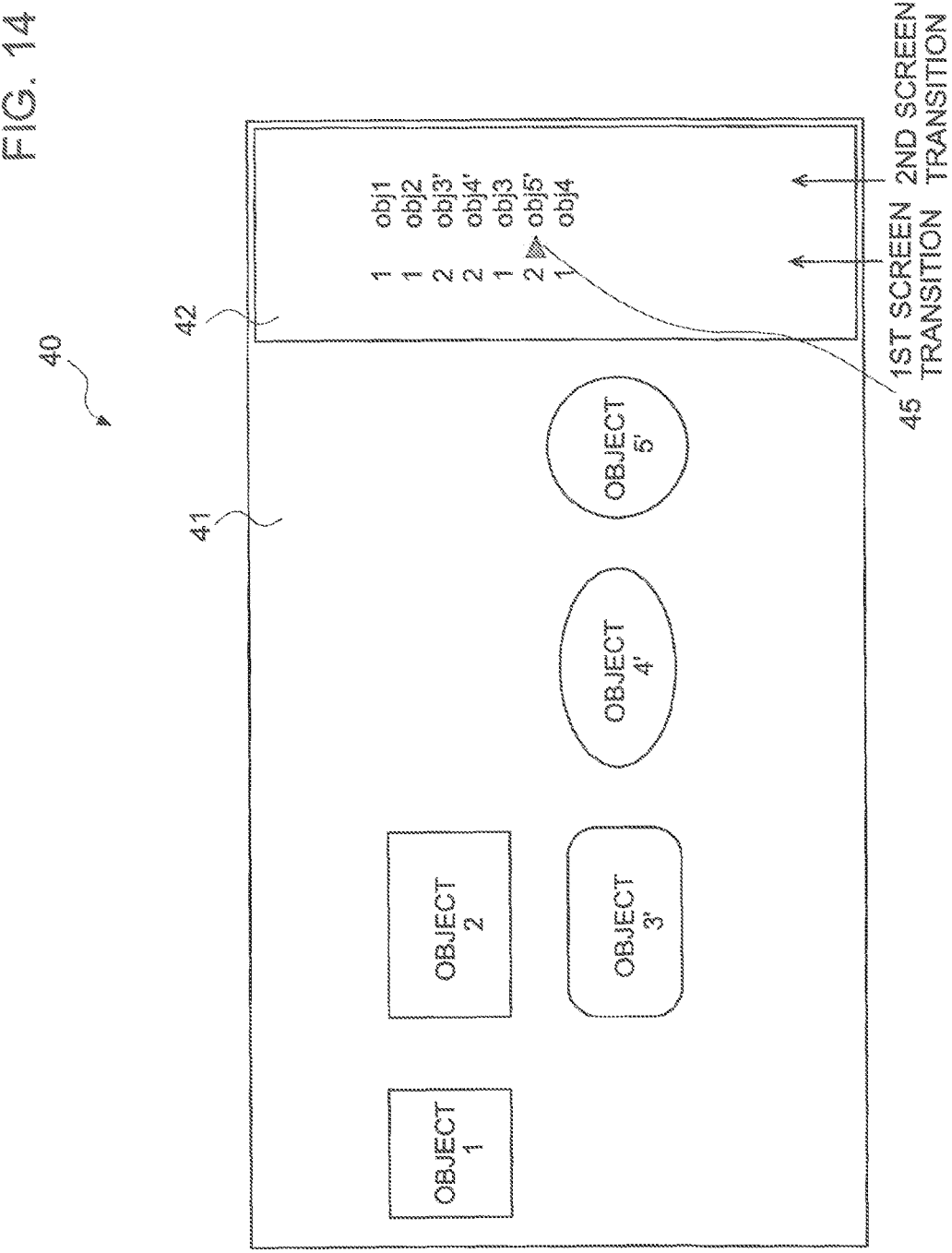

FIG. 15

```
Page_ID=0
ID        parent_ID      start_position
0         ra             0:00:00
1         0              0:31:20
2         1              0:10:52
3         0              0:45:29
```

FIG. 16

```
ID=0
Time      screen_data    memo_data
0:00:00   <SCREEN DATA>
0:13:20   <SCREEN DATA>
0:22:22
0:36:50
0:52:15
```
```
ID=1
Time      screen_data    memo_data
0:00:00   <SCREEN DATA>
0:05:11   <SCREEN DATA>
0:18:32   <SCREEN DATA>  <MEMO DATA>
```
```
ID=2
Time      screen_data    memo_data
0:00:00   <SCREEN DATA>
0:03:11   <SCREEN DATA>
0:05:33   <SCREEN DATA>
0:12:47   <SCREEN DATA>  <MEMO DATA>
```
```
ID=3
Time      screen_data    memo_data
0:00:00   <SCREEN DATA>
0:04:30   <SCREEN DATA>
0:08:12   <SCREEN DATA>  <MEMO DATA>
0:13:25   <SCREEN DATA>  <MEMO DATA>
```

```
Page_ID    current_ID    current_position
0          1             0:18:32
1          0             0:17:44
```

INFORMATION DISPLAY APPARATUS, NON-TRANSITORY COMPUTER-READABLE STORAGE MEDIUM AND DISPLAY CONTROL METHOD

This application is based on Japanese Patent Application No. 2013-130333 filed on Jun. 21, 2013, in the Japan Patent Office, the entire content of which is hereby incorporated by reference.

TECHNICAL FIELD

The present invention relates to an information display apparatus, a non-transitory computer-readable storage medium storing a display control program, and a display control method. In particular, the present invention relates to an information display apparatus which can display information on a screen, a non-transitory computer-readable storage medium storing a display control program for controlling display of the information in the information display apparatus, and a display control method for controlling display of the information in the information display apparatus.

BACKGROUND

In recent years, there have been held electronic conferences in which an electronic device such an electronic whiteboard equipped with a touch panel is used so that a plurality of users can input information about the conference and progress the conference with looking at the information. In such electronic conferences, users progress a discussion while freely inputting information (performing operations) on the electronic device, which sometimes causes a situation that the display of the electronic device has to be restored to the former state and a situation that the former state at a certain point in time has to be reproduced. To address this issue, such the electronic device is configured to record a series of operations and reproduce a state of the display at a certain point in time by undoing the operations.

As a technique about the above-mentioned undoing of operations, for example, Japanese Laid-Open Patent Application Publication No. H07-200226 discloses a visualizing device of an operation sequence. The device includes an operation recognizing section configured to convert an operation performed by a user into a command, and an operation-sequence recording section configured to store the commands converted by the operation-recognition section as an operation sequence. The device further includes an operation-sequence converting section configured to convert the operation sequence into a directed graph, an operation-sequence displaying section configured to display the directed graph in an editable form, and an operation-sequence executing section configured to re-execute the operation sequence, based on the directed graph. This publication discloses that the device converts a history of the operations, which was performed by a user on the data, into a directed graph which is easy to be edited and reused by the user, and presents the directed graph to the user.

Concretely, in a conference system using an information display apparatus such as an electronic whiteboard, for example, when users have a discussion on a first point of argument with performing operations of serially writing pieces of information (for example, objects such as characters and figures) on a screen of the device, it sometimes is desired to discuss again a second point of argument while tracing back to a certain point of time. Further, it is sometimes desired to trace back to a certain point of time to correct the written information and to discuss again the first point of argument.

In these cases, it is necessary to trace back to an intended point of time. However, a conventional information display apparatus is configured to only store a series of operations in order, and if another operation has been performed after going back to a certain point of time, the conventional information display apparatus hardly reproduces the state of the screen at the intended point of time just by using a method of serially undoing operations. Further, in Japanese Laid-Open Patent Application Publication (JP-A) No. H07-200226, it is described that the conventional information display apparatus is configured to display an operation performed after an undo operation as a branch of the original operation before being undone. However, for example, the conventional information display apparatus is configured to also deal a history of a branch which was purposely performed for a certain purpose, as a branch which was purposelessly undone with this arrangement; thus, with such a display method, it is difficult for users to appropriately determine what time point to trace back, whereby there is a problem that it is difficult for users to reproduce a desired state. The present invention seeks to solve the problem.

SUMMARY

There are disclosed illustrative information display apparatuses, non-transitory computer-readable storage media each storing a display control program, and display control methods.

An illustrative information display apparatus reflecting one aspect of the present invention is an information display apparatus comprising: a display section configured to display an object thereon; an operation section configured to operate the object; and a processing section configured to control the display section and the operation section. The processing section is configured to operate the display section to display a first screen showing the object and a second screen showing a screen transition diagram, into a display area of the display section. The screen transition diagram represents change in display of the first screen and showing first screen-transition and second screen-transition to be recognizable, where the first screen-transition represents change in display of the first screen, and the second screen-transition represents another change in display of the first screen starting at a certain point in the first screen-transition.

An illustrative non-transitory computer-readable storage medium reflecting one aspect of the present invention stores a display control program to be executed in an image forming apparatus. The image forming apparatus includes a display section configured to display an object and an operation section configured to operate the object. The display control program, when being executed by a processor of the image forming apparatus, causes the processor to perform the following processes. The processes comprise: operating the display section to display a first screen showing the object, into a display area of the display section; and operating the display section to display a second screen showing a screen transition diagram representing change in display of the first screen, into the display area. The operating the display section to display the second screen includes operating the display section to display in the screen transition diagram a first screen-transition and a second screen-transition to be recognizable. The first screen-transition represents change in display of the first screen.

The second screen-transition represents another change in display of the first screen starting at a certain point in the first screen-transition.

An illustrative display control method reflecting one aspect of the present invention is a display control method of an image display apparatus including a display section configured to display an object and an operation section to operate the object. The display control method comprises: operating the display section to display a first screen showing the object, into a display area of the display section; and operating the display section to display a second screen showing a screen transition diagram representing change in display of the first screen, into the display area. The operating the display section to display the second screen includes operating the display section to display in the screen transition diagram a first screen-transition and a second screen-transition to be recognizable. The first screen-transition represents change in display of the first screen. The second screen-transition represents another change in display of the first screen starting at a certain point in the first screen-transition.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 1 is a diagram schematically illustrating a configuration of an information display apparatus according to an embodiment of the present invention;

FIG. 2 is a block diagram illustrating a configuration of an information display apparatus according to an embodiment of the present invention;

FIG. 3 is a diagram illustrating a configuration (the state before being branched) of a screen displayed on an information display apparatus according to an embodiment of the present invention;

FIG. 4 is a diagram illustrating a configuration example (the branched state) of a screen displayed on an information display apparatus according to an embodiment of the present invention;

FIG. 5 is a diagram illustrating a configuration example (the state after being branched) of a screen displayed on an information display apparatus according to an embodiment of the present invention;

FIG. 14 is a diagram illustrating a variation of a screen configuration displayed on an information display apparatus according to an embodiment of the present invention;

FIG. 15 illustrates a table of screen transition information stored in an information display apparatus according to an embodiment of the present invention;

FIG. 16 illustrates a table of detailed screen transition information stored in an information display apparatus according to an embodiment of the present invention;

DETAILED DESCRIPTION

Figure 6:
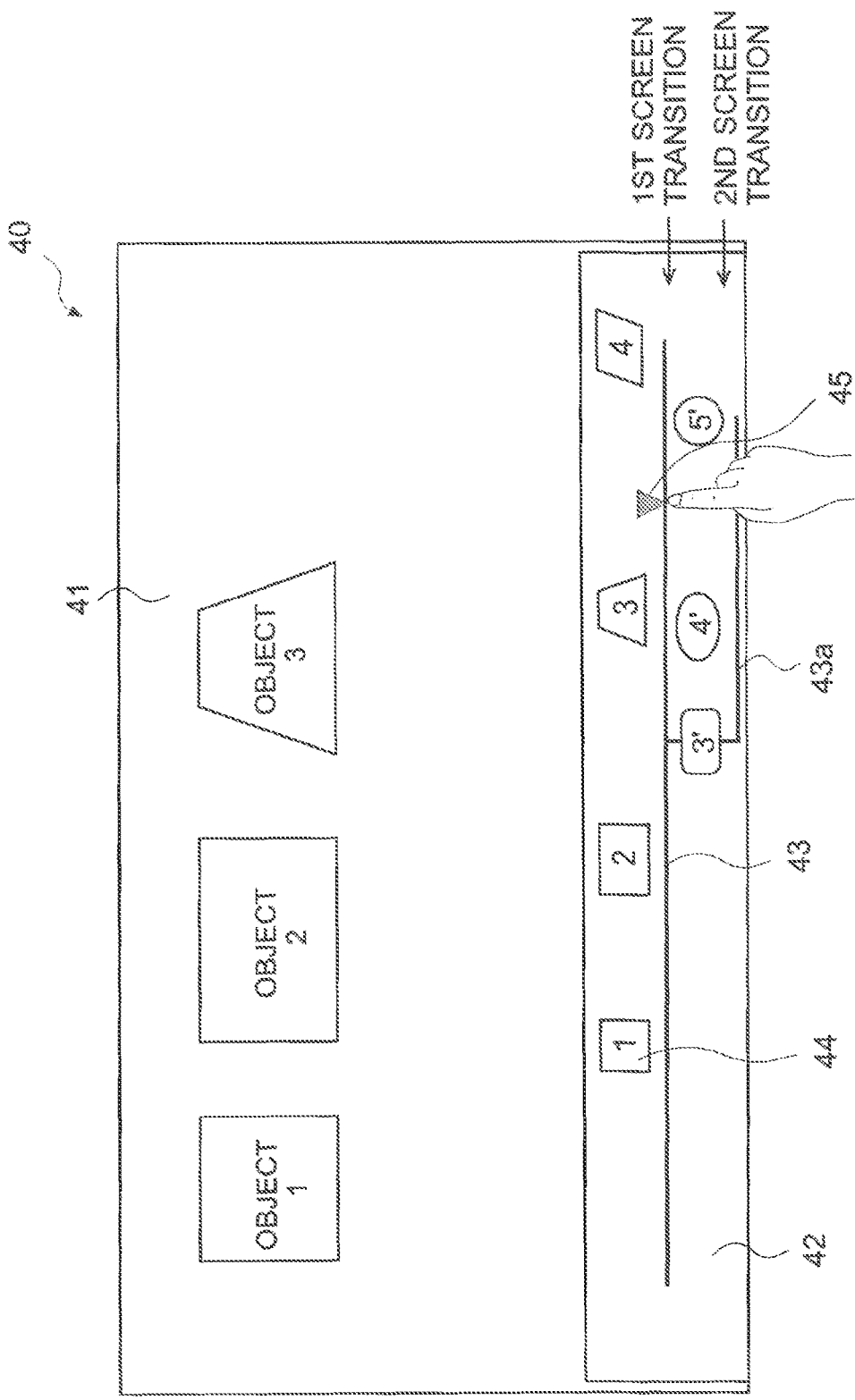
FIG. 6 is a diagram illustrating a configuration example (the state in which a screen has been changed) of a screen displayed on an information display apparatus according to an embodiment of the present invention.

Illustrative embodiments of information display apparatuses, non-transitory computer-readable storage media each storing a display control program and display control methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

The information display apparatuses, the non-transitory computer-readable storage media each storing a display control program, and the display control methods as the embodiments, allow a user to recognize the change in the display state (change in display) of the screen of the information display apparatuses easily and are capable of easy reproduction of the display state at an arbitrary point of time.

That is because the processing section of the information display apparatus (display control program) is configured to perform the following processes. The processing section displays the first screen showing an object in the display area, and displays the second screen showing a screen transition diagram representing change in the display (caused by operations on the object, such as addition, movement, edition, enlargement/reduction, and deletion of the object) of the first screen so as to display first screen-transition and second screen-transition in a recognizable manner. The first screen-transition represents change (first change) in display of the first screen in the screen transition diagram. The second screen-transition represents another change (second change) in display of the first screen, starting at the predetermined point of time in the first screen-transition. Optionally, when the first screen is displayed in the display area based on the first screen-transition or the second screen-transition, the processing section creates screen transition information and records the screen transition information, at a series of points in time. Optionally, the processing section displays a main line and a branch line each representing a time course, and an indication mark for indicating a position on the main line or the branch line in the screen transition diagram. When receiving an operation of moving the indication mark on the main line or the branch line, the processing section reproduces the display of the first screen by using the screen transition information corresponding to the position to which the indication mark is moved to.

With this arrangement, by just glancing at the second screen, users can recognize how the display of the first screen changed with time, and the display of the first screen at an arbitrary point of time can be reproduced easily only by indicating a concerned position on the second screen.

As described in the descriptions about the background, a conference system like an electronic whiteboard is desired to be configured to trace back to an arbitrary point of time and display a screen at the arbitrary point of time. However, the conventional information display apparatus is configured to only record a series of operations in order; thus, in the case that operations are complex such that another operation was performed on the screen after tracing back to an earlier point of time, the conventional information display apparatus hardly reproduces the display of the screen at a desired point in time just by using a method of undoing operations in order. Alternatively, even if the conventional information display apparatus is configured to display operations after an undo operation are displayed as branches of original operations, as described in JP-A No. H07-200226, the conventional information display apparatus deals a history of operations which was purposely performed as the branch, as the same branch as a history of operations which was simply undone; thus, it is difficult for users to appropriately determine what time point to trace back, in order to reproduce a desired state, which is a problem.

To address this issue, an information display apparatus as an embodiment of the present invention, has a structure configured to operate the display section to display a main screen (first screen) for showing an object in the display area and display a sub-screen (second screen) in the display area in addition to the main screen so as to display in the sub-screen information (main line, thumbnail image, or the like) for representing change in the display of the main screen in time series. Further, the structure is configured to, with movement of an indication mark, which indicates a position on the main line in the direction of the time series, reproduce in the display area the display of the main screen at the point of time indicated by the indication mark. Further, the structure is configured to, with movement of the indication mark in the direction perpendicular to the time series (for example, the direction perpendicular to the main line), display in the sub-screen, information (branch line, thumbnail image, or the like) for representing the change in the display of the main screen in time series, starting at the point of the operation. Thereby, the information display apparatus allows users to recognize how the main screen has changed in time, by only a glance at the sub-screen, and to reproduce the display of the main screen at a desired point of time easily only by manipulating the indication mark on the sub-screen.

EXAMPLES

Figures 17, 18:
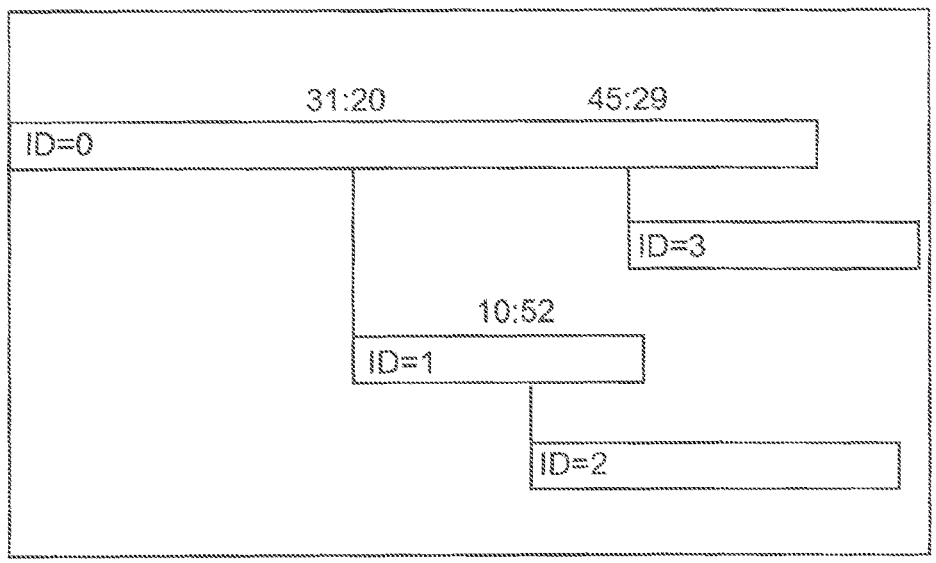
FIG. 17 illustrates a table of information about a current position stored in an information display apparatus according to an embodiment of the present invention.
FIG. 18 illustrates a configuration example of a sub-screen based on the information of FIG. 15 to FIG. 17.
Figure 19:
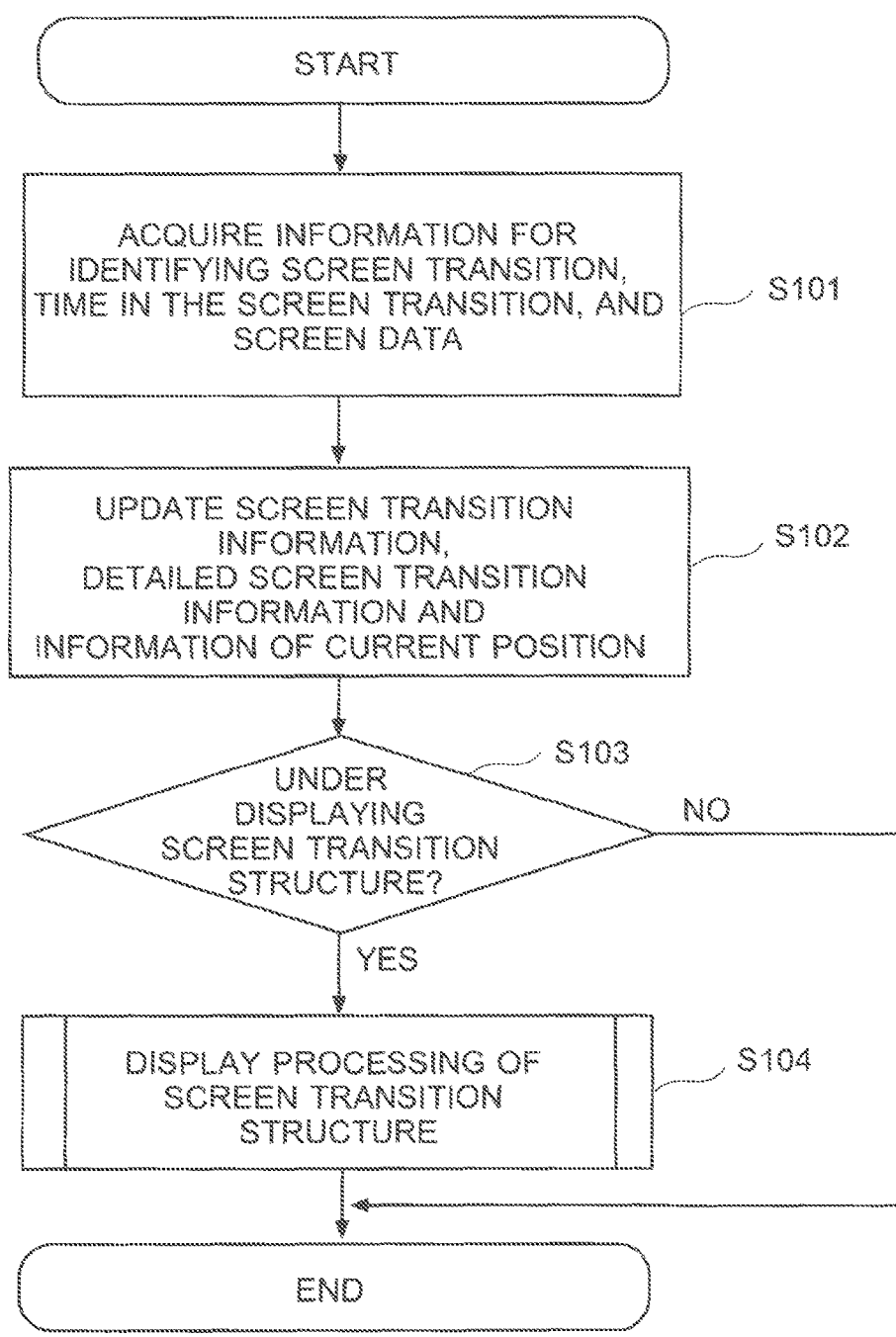
FIG. 19 illustrates a flowchart of a process (process of recording screen transition) in an information display apparatus according to an embodiment of the present invention.
Figure 20A:
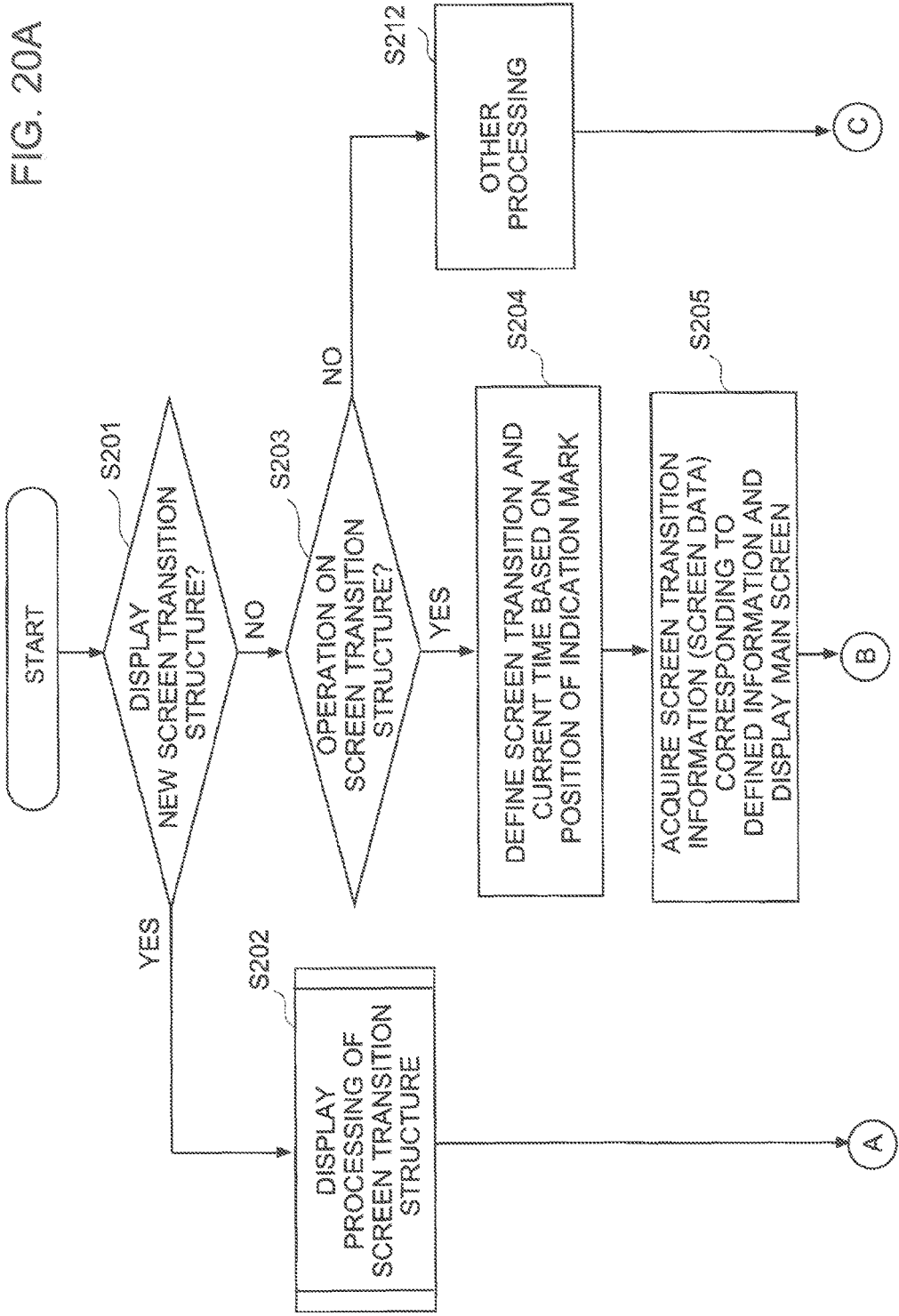
FIGS. 20A and 20B illustrate a flowchart of a process (process of inputting screen operations) in an information display apparatus according to an embodiment of the present invention.
Figure 20B:
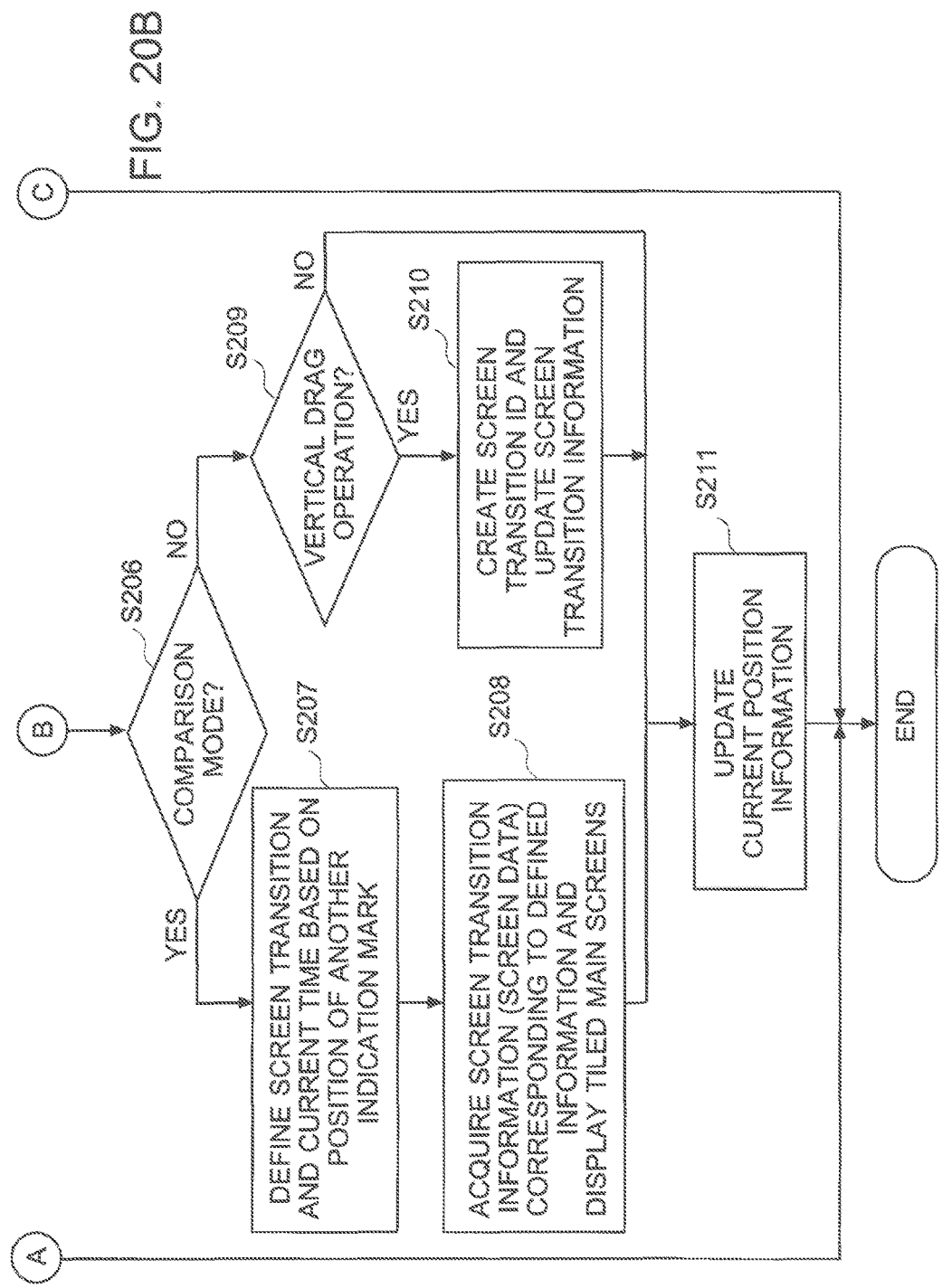
Figure 21:
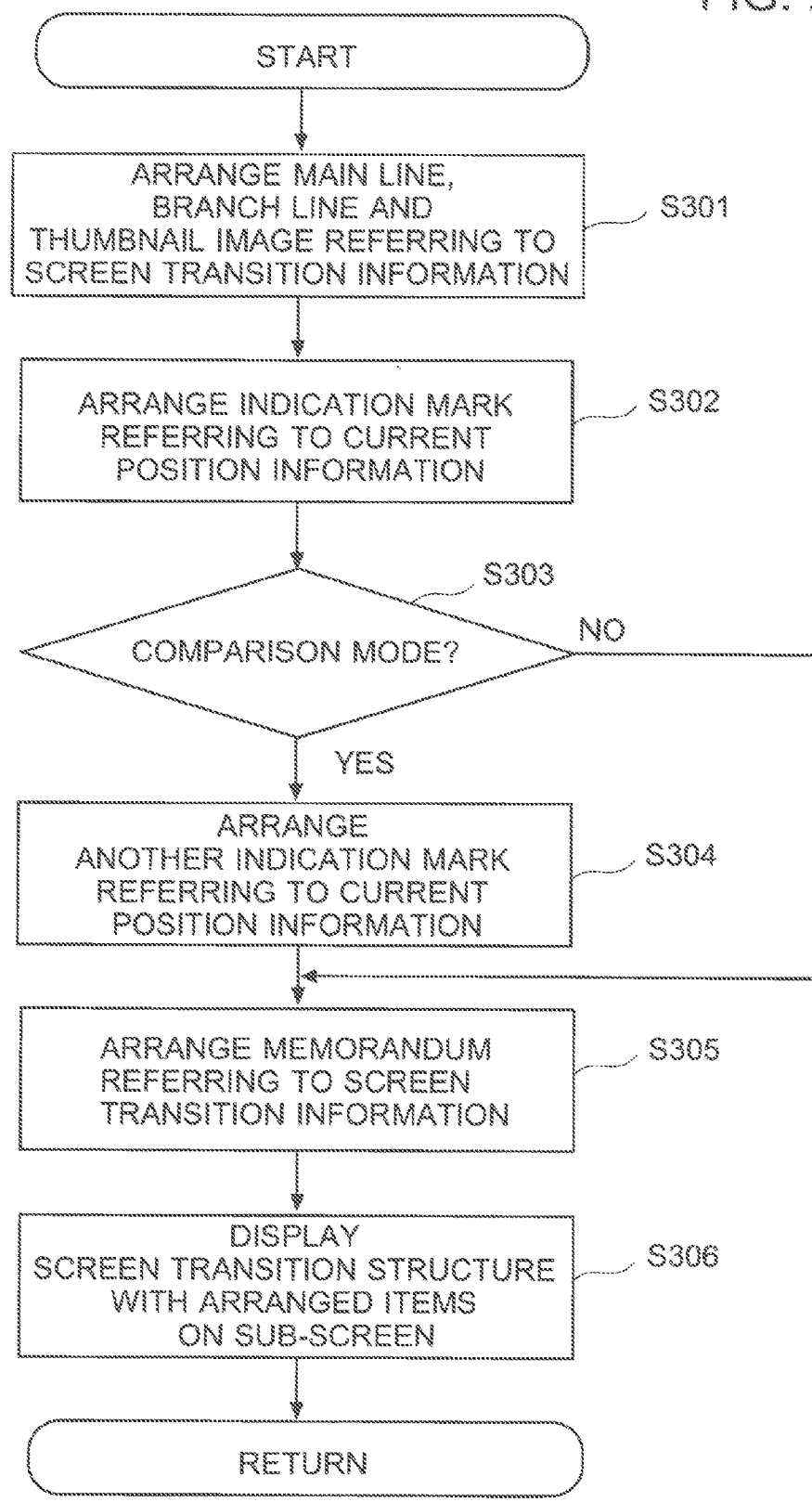
FIG. 21 illustrates a flowchart of a process (process of displaying screen transition structure) in an information display apparatus according to an embodiment of the present invention.

In order to describe the above embodiments in more detail, description will be made on an illustrative information display apparatus, a non-transitory computer-readable storage medium storing an illustrative display control program, and a illustrative display control method with reference to FIG. 1 to FIG. 21. FIG. 1 is a diagram schematically illustrating a configuration of the information display apparatus of the present example, and FIG. 2 is a block diagram illustrating a configuration of the information display apparatus. FIG. 3 to FIG. 14 and FIG. 18 illustrate examples of the a screen to be displayed on the information display apparatus of the present example, and FIG. 15 to FIG. 17 illustrate examples of the information stored in the information display apparatus. FIG. 19 to FIG. 21 illustrate flowcharts of processes to be performed in the information display apparatus of the present example.

In the following description, objects include a character and a figure each handwritten on a touch panel, a photo image displayed on a screen, a working area (window) of an application shown on the screen, and the like. The term "operation" is a generic term for operations for changing the state of an object such as addition, movement, edition, enlargement/reduction, deletion, and the like with respect to the objects. Further, the term "event" represents a change in a state of an object.

As illustrated in FIGS. 1 and 2, the information display apparatus of the present example can be a device (the device in FIG. 1 is an electronic whiteboard) equipped with both of a display function and an operation function such as an electronic whiteboard, a tablet terminal, a computing device and the like. The information display apparatus includes a display and operation section 10, a processing section 20, and a recording section 30.

The display and operation section 10 can be a pressure-sensitive-type or capacitance-type touch panel. The display and operation section 10 includes a display section 10a such as an LCD (Liquid Crystal Display), an organic EL (Electro Luminescence) display, and an operation section 10b, such a touch sensor, composed of grid-like transparent electrodes arranged on the display section. The display and operation section 10 is configured to display, in a display area of the display section, a main screen for showing an object and a sub-screen for showing a structural diagram (referred to as a "screen transition structure" or "screen transition diagram") composed of characters and figures representing change of a display state (referred to as "screen transition") of the main screen (in other words, a display state of an object on the main screen). Further, the display and operation section 10 is configured to receive an operation on an object performed on the main screen and an operation of an instruction about screen transition on the sub-screen. Note that the operation section may include a hardware key or the like in addition to the touch sensor. Although, in the present example, the display and operation section 10 is a touch panel in which the display section 10a and the operation section 10b are integrated, the display section 10a and the operation section 10b may be prepared as separated bodies.

The processing section 20 is composed of a CPU (Central Processing Unit) and a memory such as a ROM (Read Only Memory), a RAM (Random Access Memory), and the like. The CPU is configured to control whole of the information display apparatus by developing, on the RAM, a control program stored in the ROM and executing the program. In particular, in the present example, the processing section 20 works as a user operation interpreting section 21, a screen control section 22, a screen information recording section 23, a screen transition structure creating section 24, and a screen reproducing section 25.

The user operation interpreting section 21 is configured to interpret, based on signals outputted from the display and operation section 10, an operation performed by a user on the display and operation section 10, and communicate the user's operation to the screen control section 22.

The screen control section 22 is configured to update a screen, based on the user's operation interpreted by the user operation interpreting section 21, and to perform both of operating the display and operation section 10 to display the updated screen and communicating the screen information (information related to screen data of the main screen and to the screen transition diagram of the sub-screen) to the screen information recording section 23. In addition, the screen control section 22 is configured to operate the display and operation section 10 to display the sub-screen (screen transition diagram) created by the screen transition structure creating section 24 and to operate the display and operation section 10 to display the main screen reproduced by the screen reproducing section 25.

The screen information recording section 23 is configured to create, based on the screen information obtained from the screen control section 22, screen transition information and current position information to be described later, and record the screen data of the main screen, the screen transition information and the current position information into the recording section 30 at regular intervals or at the time of occurrence of an event.

The screen transition structure creating section 24 is configured to read the screen transition information and the current position information from the recording section 30, create the screen transition structure (the screen transition diagram) representing the screen transition of the main screen, based on the read information, and pass the screen transition structure to the screen control section 22.

The screen reproducing section 25 is configured to read the screen data of the main screen, from the recording section 30, at the point of time which is specified by a user, and pass the screen data to the screen control section 22.

The user operation interpreting section 21, the screen control section 22, the screen information recording section 23, the screen transition structure creating section 24, and the screen reproducing section 25 described above may be configured as hardware, or the processing section 20 may be configured to work, by using a software (the display control program), as the user operation interpreting section 21, the screen control section 22, the screen information storing section 23, the screen transition structure creating section 24, and the screen reproducing section 25. That is, the display control program, when being executed by the CPU, may cause the CPU to work as those sections.

The recording section 30 is an HDD (Hard Disk Drive), an SSD (Solid State Drive), an SD (Secure Digital), or the like, and stores the screen data of the main screen, the screen transition information, the current position information, and the like received from the screen information recording section 23.

FIG. 1 and FIG. 2 are examples of the information display apparatus of the present example, and the configurations thereof may be modified as needed without departing from the spirit of the present invention. For example, in FIG. 1, the information display apparatus of the present example is an electronic whiteboard, and the display and operation section 10 is separated from the processing section 20 and the recording section 30. However, similarly to a tablet terminal, the display and operation section 10, the processing section 20, and the recording section 30 may be integrated in one body, or the processing section 20 and the recording section 30 may be integrated as a controller like a computing device. Further, in FIG. 2, the processing section 20 is composed of the user operation interpreting section 21, the screen control section 22, the screen information recording section 23, the screen transition structure creating section 24, and the screen reproducing section 25; however, the names and the functions of the components are not limited to those illustrated in FIG. 2.

Then, description will be made on a screen displayed in the display area of the display and operation section 10. The screen displayed in the display area of the display and operation section 10 is constituted by the main screen for showing an object and the sub-screen for showing a screen transition structure representing the screen transition of the main screen. The display of the main screen at the point of time specified by a user is created by the screen reproducing section 25, and is displayed by the screen control section 22 on the display and operation section 10. Further, the screen transition structure to be displayed on the sub-screen is created by the screen transition structure creating section 24, and is displayed by the screen control section 22 on the display and operation section 10. For the sake of easy understanding, in the present example, objects are represented by simple figures, and the operation is assumed to be addition of an object.

FIG. 3 is an example of a screen 40 of the display and operation section 10 of the present example. On the main screen 41, objects 1 to 4 serially added are displayed. Further, on the sub-screen 42, as the screen transition structure representing the screen transition of the main screen 41, there are displayed a figure representing a time course (referred to as a "main line 43"), information representing the display of the main screen 41 at a certain position on the main line 43 (that is, at a certain point in time), and an arbitral figure representing the current position on the main line 43 (referred to as "indication mark 45"). Examples of the information representing the display of the main screen 41, include a thumbnail image 44 prepared by reducing the display of the main screen 41 or reducing the object changed in display on the main screen 41. In this example, the thumbnail image 44 prepared by reducing an added object is used as the information. As the indication mark 45, a triangle mark is user in this example.

Then, as illustrated in FIG. 4, when the indication mark 45 is moved (here, the indication mark 45 is moved after an object 2 is added) along the main line 43 on the sub-screen 42, information (the objects 1 and 2, here) which has been shown in the main screen 41 at that point of time, appears on the main screen 41. When the indication mark 45 is further moved on the sub-screen 42 in the direction different from the direction of the main line 43 (the direction perpendicular to the main line 43, hereinafter), the main line 43 is branched; and at that state, if an object on the main screen 41 is modified, or a new object is added (an object 3' is added, here), the thumbnail image 44 of the added object is added onto the sub-screen 42.

Here, there is provided an illustrative case that the display of the main screen 41 changes (the object on the main screen 41 is modified) under the condition that the indication mark 45 has been moved along the main line 43 on the sub-screen 42. If the indication mark 45 is manipulated to be moved in the direction perpendicular to the main line 43 under this case, the processing section 20 determines that there is caused a new screen transition, and if the indication mark 45 is not manipulated to be moved in the direction perpendicular to the main line 43 in this case, the processing section 20 determines that there is caused no new screen transition but is modification in the original screen transition. With this manipulation, a user can choose whether to record the screen transition as a new screen transition starting at the trace-backed point of time or modify (overwrite) the original screen transition.

FIG. 5 illustrates the situation that new objects (objects 4' and 5') have been further added to the main screen 41 at the state of FIG. 4. In this case, on the sub-screen 42, there is displayed the branch line 43a branched from the main line 43 representing the original transition (first screen-transition) of the main screen 41, and on the branch line 43a there is added thumbnail images 44 which are reduced version of the main screen 41 or is reduced version of the newly added objects.

As describe above, because the sub-screen 42 shows the main line 43 for representing the screen transition of the main screen 41 and the thumbnail images 44 representing the display of the main screen 41 at respective points of time around the respective positions each indicated by the indication mark 45, a glance at the sub-screen 42 can make a user recognize how the main screen 41 has changed. In addition, when the indication mark 45 is only moved along the main line 43, the display of the main screen 41 at that point of time is reproduced; thus, a user can confirm the display of the main screen 41 while tracing back to an arbitrary point of time. Alternatively, when the indication mark 45 is move in the direction perpendicular to the main line 43, the branch line 43a branched off from the main line 43 appears on the sub-screen 42; thus, a user can easily recognize when the main screen 41 was branched off and how the main screen 41 has transited from a glance at the sub-screen 42.

FIG. 6 illustrates the situation that the indication mark 45 has been moved to the main line 43 from the branch line 43a at the state of FIG. 5. For example, when the indication mark 45 has been moved to between the objects 3 and 4 on the main line 43, the objects (objects 3' to 5') of the second screen-transition disappear from the main screen 41, and the object (object 3) of the first screen-transition appears on the main screen 41. As described above, by moving the indication mark 45 to an arbitrary position on the main line 43 and the branch line 43a on the main screen 41, the state, at that point of time, of the first screen-transition or the second screen-transition is reproduced; thus, a user can trace back to an arbitrary point of time to confirm the display of the main screen 41.

FIG. 5 and FIG. 6 illustrate the case that the branch line 43a has been branched off from one position on the main line 43; however, branches may be branched off from plural positions on the main line 43 or from one or plural positions of the branch line 43a.

Figure 7:
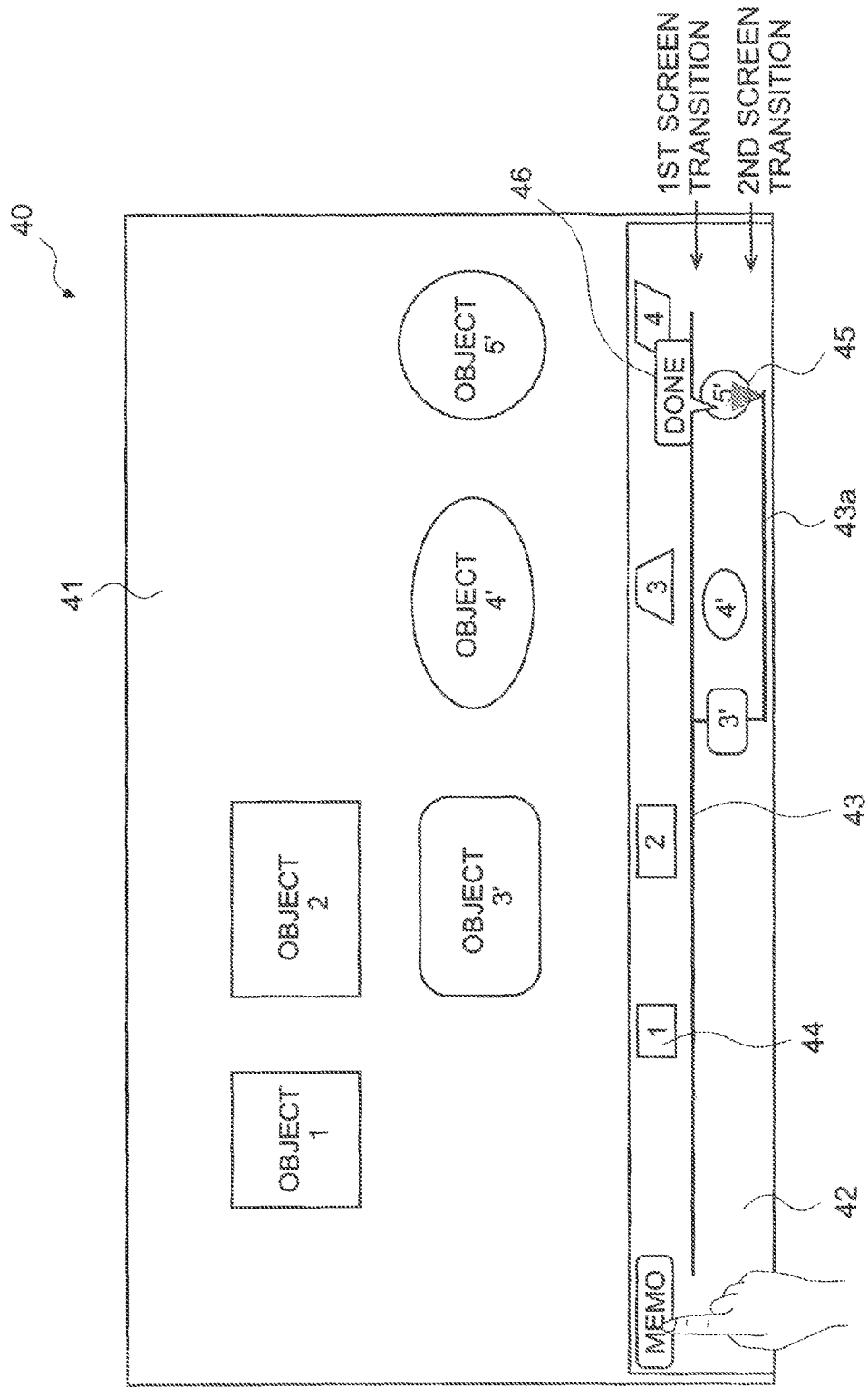
FIG. 7 is a diagram illustrating a configuration example (the state in which a memorandum has been added) of a screen displayed on an information display apparatus according to an embodiment of the present invention.

In FIG. 3 to FIG. 6, the sub-screen 42 shows the main line 43 (the main line 43 and the branch line 43a), the indication mark 45, the thumbnail images 44 as the screen transition structure representing the transitions of the main screen 41; however, additional information can be displayed on the sub-screen 42 for easy understanding of what kind of operations have been performed on the main screen 41. For example, as illustrated in FIG. 7, configuration may be made so as to, when a button provided at an arbitrary position on the main screen 41 or the sub-screen 42 (the "MEMO" button on the left top on the sub-screen 42, in FIG. 7) or a hardware key is pressed down to write a memorandum at an arbitrary place (for example, within a window to be displayed on the sub-screen 42) on the main screen 41 or the sub-screen 42, to display a memorandum 46 in the vicinity of the position indicated by the indication mark 45, and store the content of the memorandum 46 as the information about the screen transition structure.

Note that there is no limitation to the input method and the display method of the memorandum 46, and, for example, a word balloon may be displayed to clarify what point of time the memorandum 46 was added, or a different color may be used for display to highlight the memorandum 46.

Figure 8:
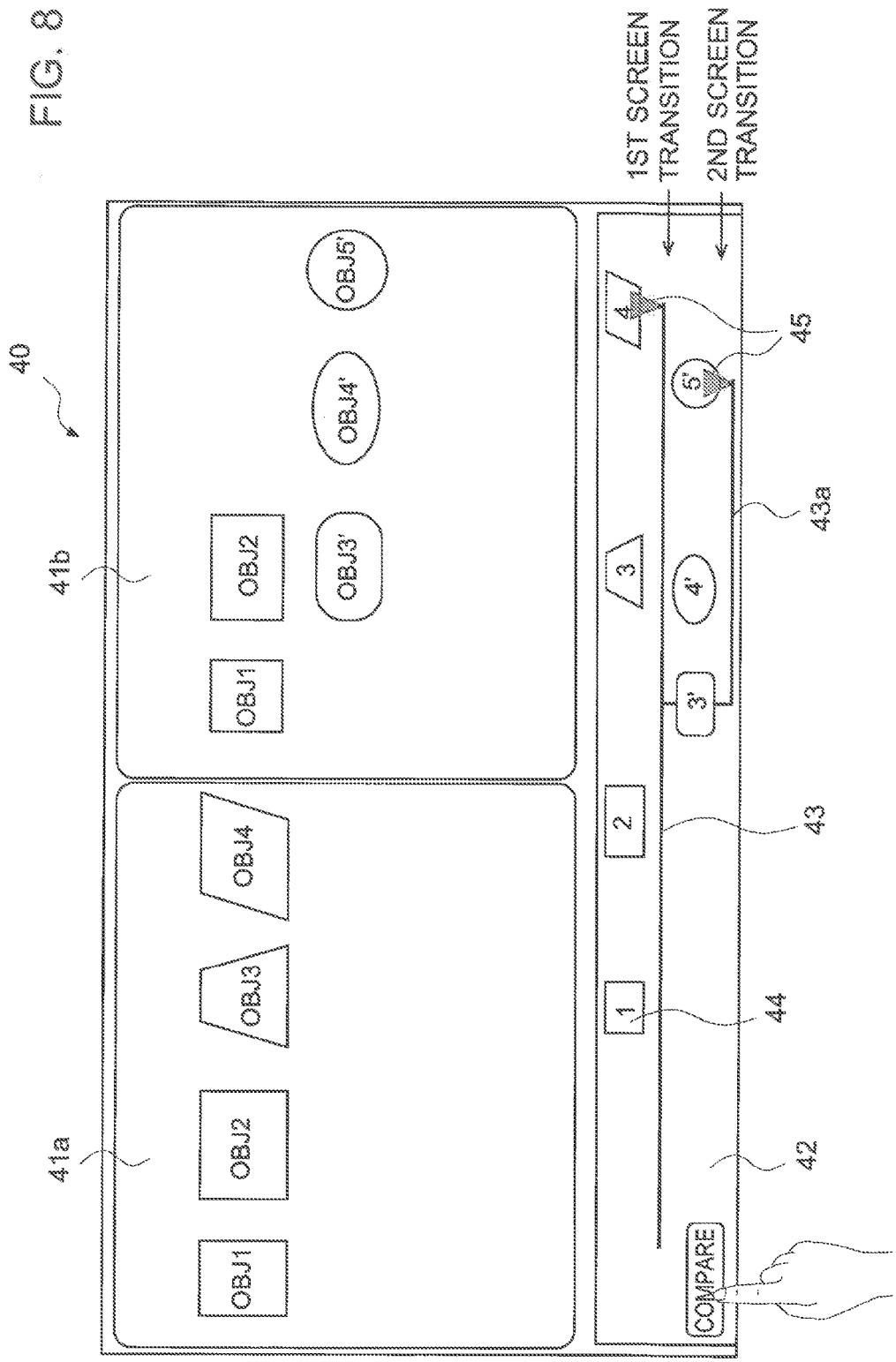
FIG. 8 is a diagram illustrating a configuration example (the state in which two a screen are displayed) of a screen displayed on an information display apparatus according to an embodiment of the present invention.

In FIG. 3 to FIG. 7, the processing section 20 is configured to make, depending on which of the main line 43 and the branch line 43a the indication mark 45 is located on, the main screen 41 show one of the first screen-transition and the second screen-transition; however, the processing section 20 may be configured to display both of the first screen-transition and the second screen-transition. For example, as illustrated in FIG. 8, the processing section 20 is configured to, when a button provided on an arbitrary position on the main screen 41 or the sub-screen 42 (a "COMPARE" button on the left low on the sub-screen 42 of FIG. 8, in this example) or a hardware key is pressed down, divide the main screen 41 into two pieces, and make one main screen 41a display the screen (the screen of the first screen-transition) at the point of time indicated by the indication mark 45 on the main line 43, and make the other main screen 41b display the screen (the screen of the second screen-transition) at the point of time indicated by the indication mark 45 on the branch line 43a. By displaying the screens at the arbitrary two different points of time to be tiled, a user can compare how the screen has been changed.

Although the main screen 41 is divided into two in FIG. 8, the processing section 20 may be configured to, when there are plural branch lines 43, divide the main screen 14 into screens, wherein one of the screens corresponds to the main line 43, and each of the other screens corresponds to each of the branch lines 43a. In FIG. 8, the two screens are laterally tiled, but there is no limitation to how screens are arranged, and the arrangement may be set depending on the shape and the size of the display and operation section 10. For example, if the display and operation section 10 is longer in the vertical direction, the screens may be displayed in a vertical arrangement. In FIG. 8, the screens have the same size; however, the screen corresponding to the main line 43 may be displayed relatively larger or displayed at a size in accordance to the number of the objects contained in the screen.

The above description is made on a basic configuration of the screen or screens displayed in the display area of the display and operation section 10 of the present example; however, the configuration of the screen 40 may be modified as far as the transition of the main screen 41 can be recognized on the sub-screen 42.

Figure 9:
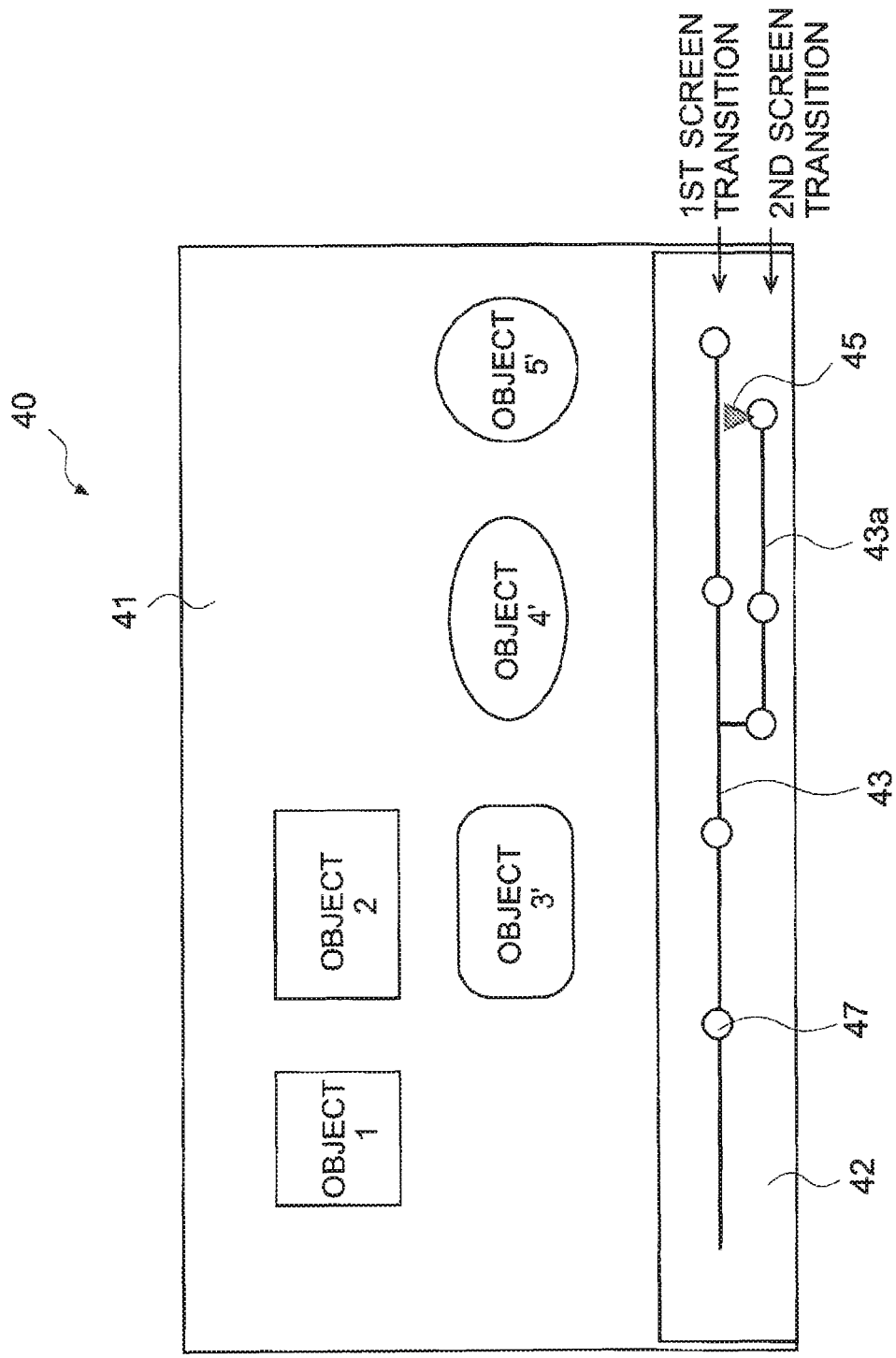
FIG. 9 is a diagram illustrating a variation of a screen displayed on an information display apparatus according to an embodiment of the present invention.

For example, in FIG. 3 to FIG. 8, there are illustrated on the sub-screen 42 the thumbnail images 44 prepared by reducing the objects as the information representing the display states of the main screen 41 at the respective points of time; however, if a user can see when the operation on the main screen 41 was performed, the user can recognize how the main screen 41 has been changed. Thus, in that case, as illustrated in FIG. 9, instead of the thumbnail images 44, arbitrary figures (referred to as "event marks 47") may be displayed to show the fact that operations were performed on the main screen 41 (in other words, some event occurred on the main screen 41).

Figure 10:
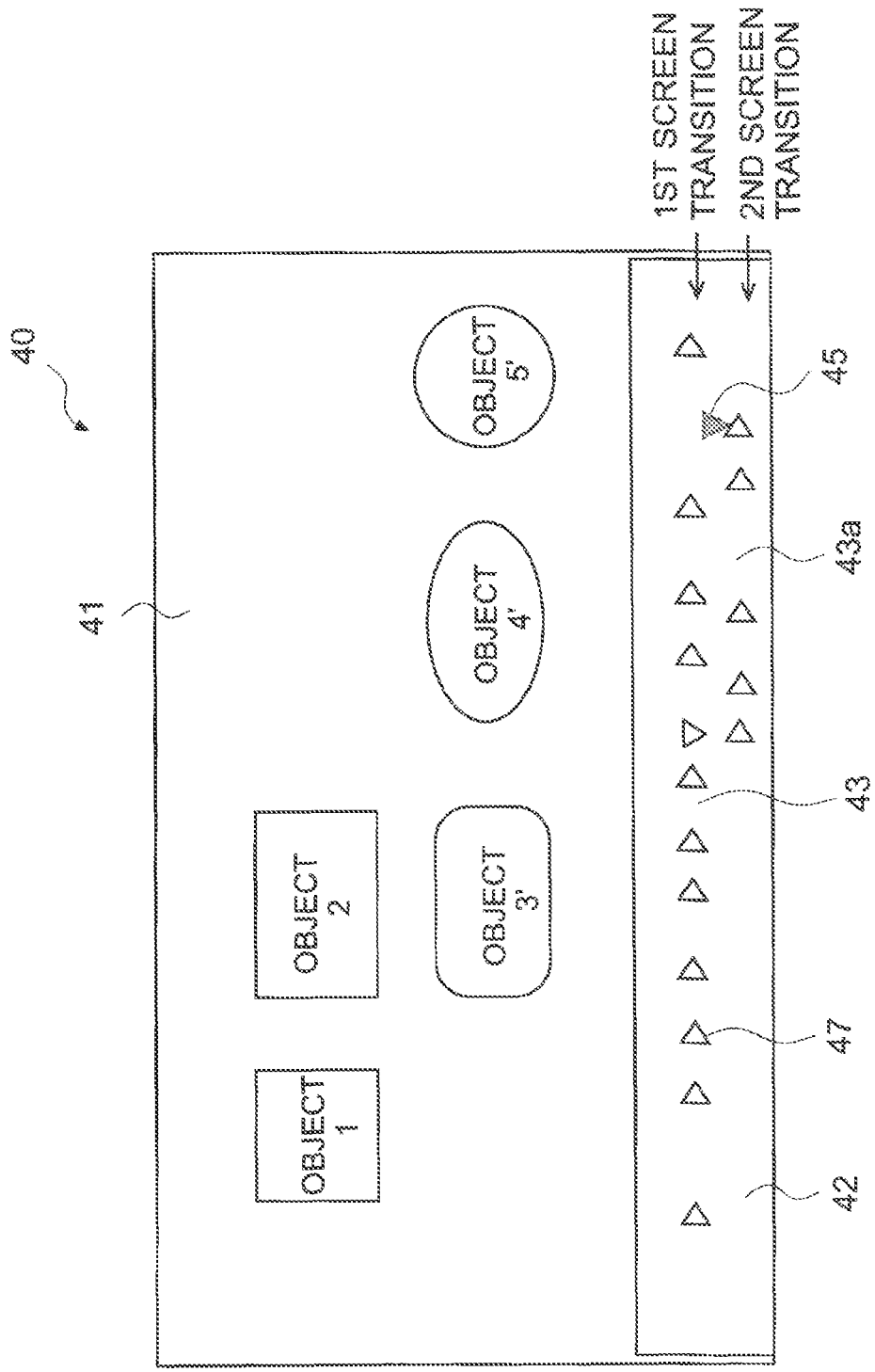
FIG. 10 is a diagram illustrating a variation of a screen configuration displayed on an information display apparatus according to an embodiment of the present invention.

Further, in FIG. 3 to FIG. 9, the main line 43 and the branch line 43a as the information representing in time series the screen transitions of the main screen 41 are displayed on the sub-screen 42; however, when the operations are frequently performed (many events are occurring) on the main screen 41, the number of the thumbnail image 44 and the event mark 47 increases, thus, the transition of the main screen 41 can be recognized only from the array of the thumbnail images 44 and the event mark 47. Thus, in such a case, the main line 43 or the branch line 43*a* may be omitted as illustrated in FIG. 10, the thumbnail images 44 and the event marks 47 (event marks 47 here) may be displayed in an array in order of time series on the sub-screen 42. Further, when the event mark 47 is displayed, the event mark 47 may be configured to be a figure (triangular or arrow, for example) from which a direction can be recognized as illustrated in FIG. 10 so that it can be easy for users to recognize when the screen transition was branched by changing the direction of the figure at the position at which the screen transition was branched.

Figure 11:
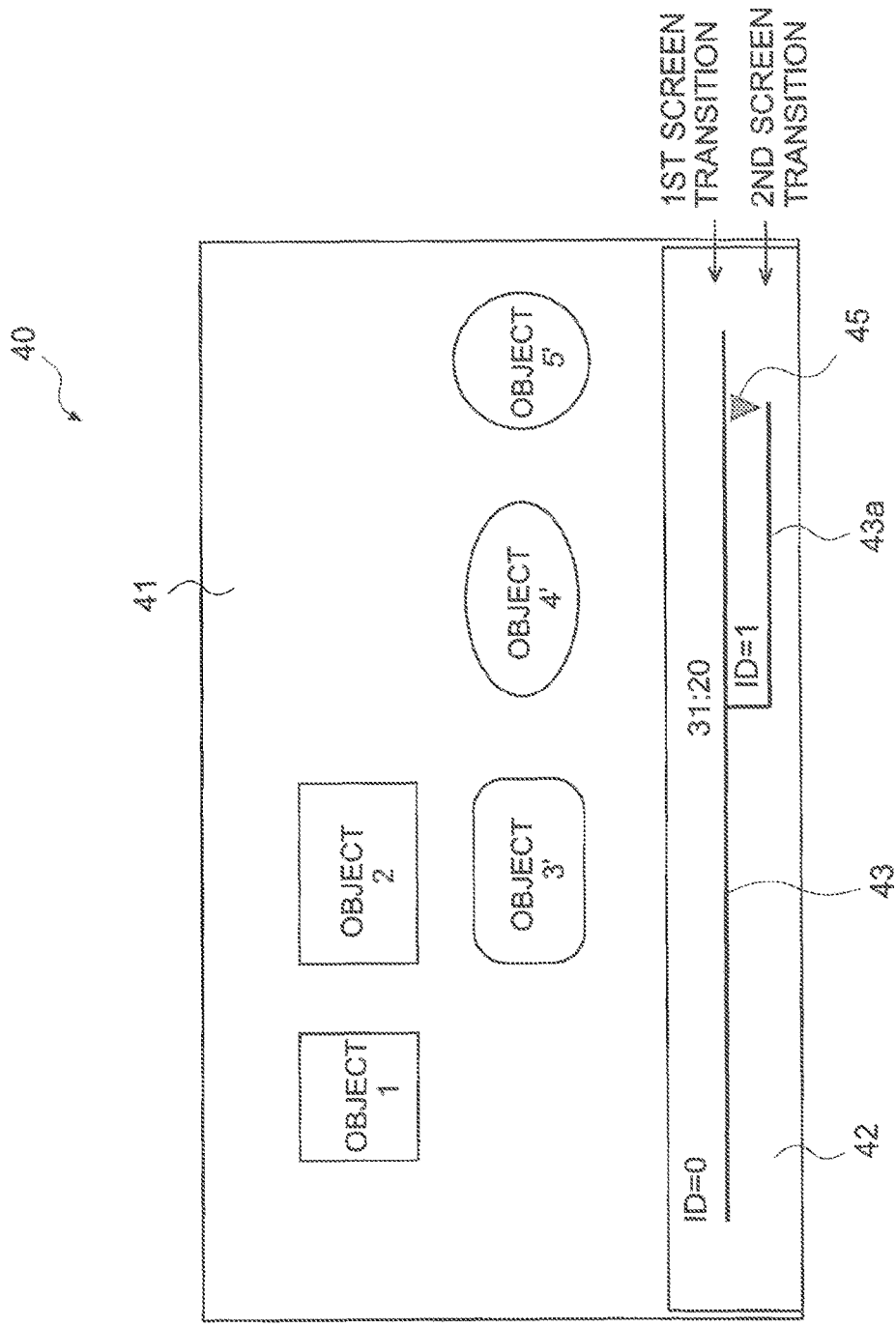
FIG. 11 is a diagram illustrating a variation of a screen configuration displayed on an information display apparatus according to an embodiment of the present invention.

In addition, in FIG. 3 to FIG. 8, the thumbnail images 44 are displayed on the sub-screen 42 to make the display state of the main screen 41 at a certain point of time recognizable; however it can be confirmed what kind of operation was performed on the main screen 41, by moving the indication mark 45 to that point to reproduce the main screen 41 at that point of time. That is to say, if the thumbnail image 44 is not displayed on the sub-screen 42, a user can recognize the screen transition of the main screen 41 if the user can know when the branch occurred. Thus, the thumbnail image 44 may be omitted as illustrated in FIG. 11, and only the main line 43 and the branch line 43*a* may be displayed on the sub-screen 42. When only the main line 43 and the branch line 43*a* are displayed, the user can easily determine which point of time on the main screen 41 to trace back to if a number (such as "ID=0" and "ID=1" in FIG. 11) for identifying the screen transition is displayed or the time ("31:20" in FIG. 11) of branching is displayed as illustrated in FIG. 11.

Figure 12:
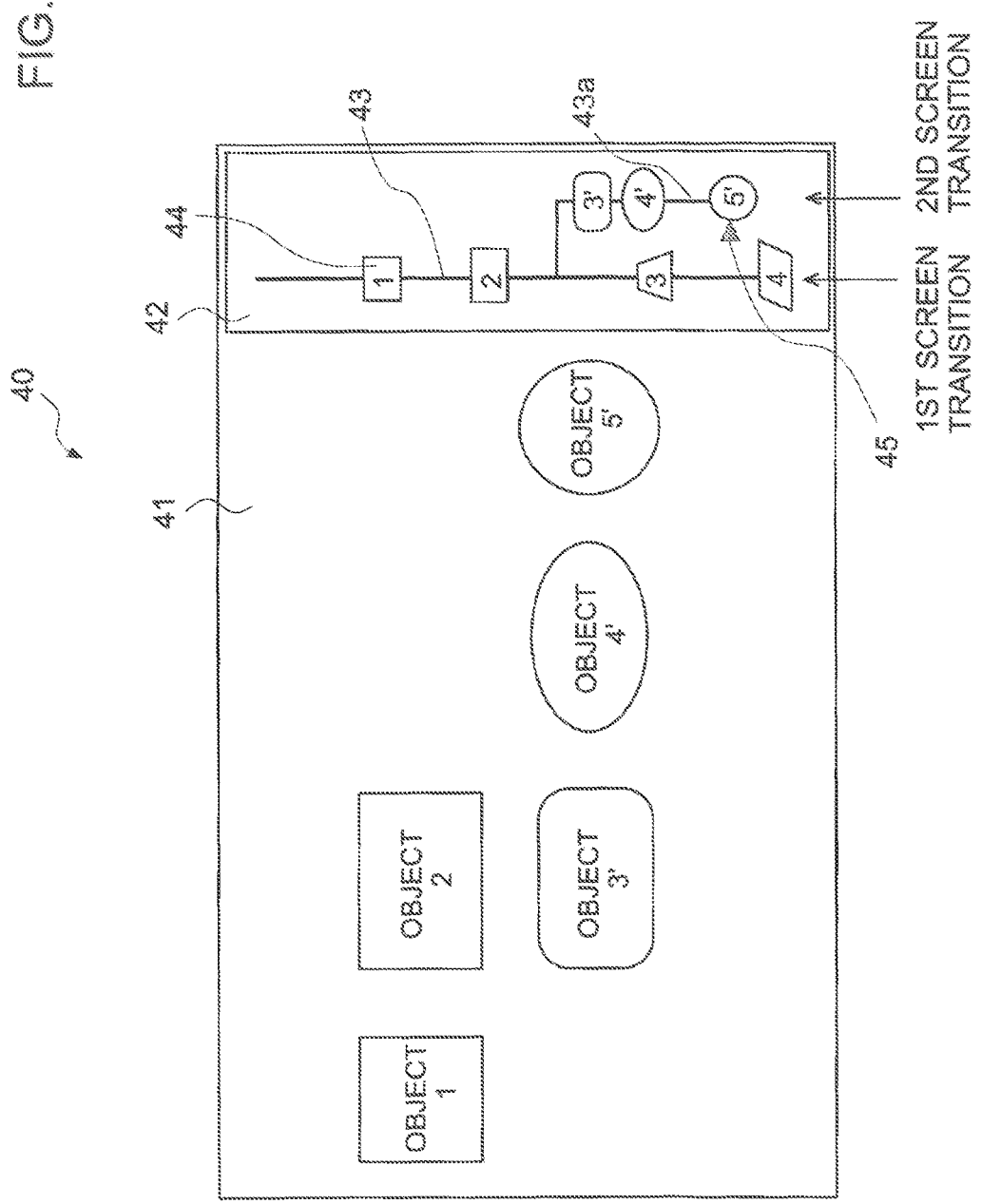
FIG. 12 is a diagram illustrating a variation of a screen configuration displayed on an information display apparatus according to an embodiment of the present invention.

In FIG. 3 to FIG. 11, the horizontal axis is used as a time axis; however, for example, the vertical axis may be used as a time axis with the main line 43 and the branch line 43*a* extended in the vertical direction as illustrated in FIG. 12, and the thumbnail images 44 representing the display states of the main screen 41 at respective points of time may be displayed in the vicinity of the main line 43 or the branch line 43*a*, and the event marks 47 may be displayed instead of the thumbnail images 44. Alternatively, in a manner similar to the case of FIG. 10, the main line 43 and the branch line 43*a* may be omitted, and the thumbnail images 44 and the event marks 47 may be displayed in an array in order of time series in the vertical direction; and alternatively, only the main line 43 and the branch line 43*a* may be displayed with the thumbnail images 44 omitted similarly to the case of FIG. 11.

Further, in FIG. 3 to FIG. 9, FIG. 11, and FIG. 12, the main line 43 and the branch line 43*a* are displayed on the sub-screen 42, and in FIG. 3 to FIG. 8, the thumbnail images 44 are displayed on the sub-screen 42 to allow a user to easily recognize the display state of the main screen 41 at a certain point of time; however, if characters representing the content of the operation performed on the main screen 41 are displayed in order of time series instead of displaying these line and images, the user also can recognize the screen transitions of the main screen 41. For example, as illustrated FIG. 13, the characters (numbers or the like to be used to recognize the added objects) representing the operation contents may be displayed in order of time series. In that case, if arrows are displayed between the characters representing the operation contents (an arrow directing in the time axis or an arrow indicating that branching occurred), a user can easily see the screen transitions of the main screen 41.

Figure 13:
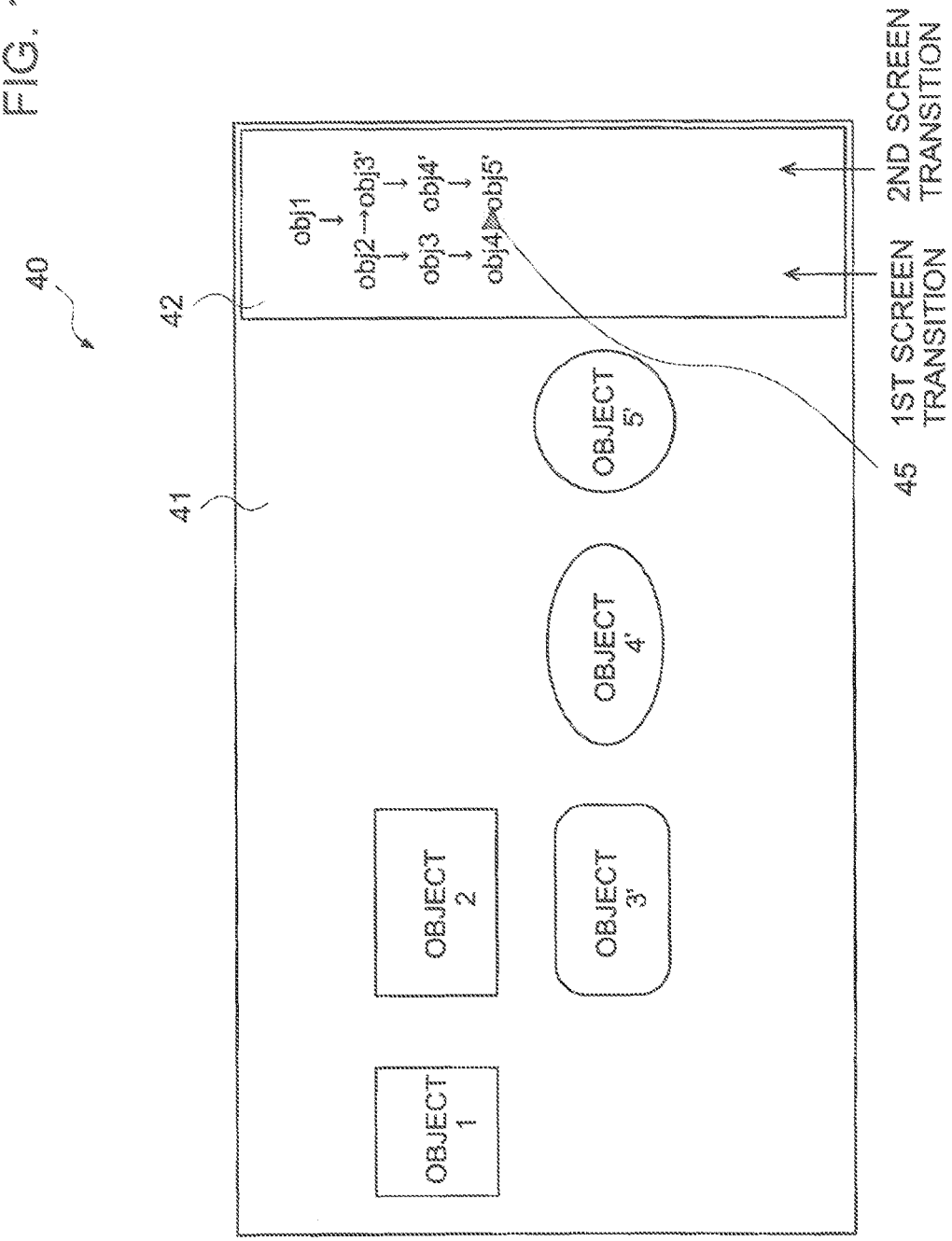
FIG. 13 is a diagram illustrating a variation of a screen configuration displayed on an information display apparatus according to an embodiment of the present invention.

In FIG. 13, the positions of the characters are made different in each screen transition to allow a user to recognize the branch; however, a set of the number of the screen transition and the characters representing the operation content may be displayed in one line in order of time series as illustrated in FIG. 14, for example, and with such a configuration, a user can understand what kind of operation has been performed on which screen transition in what order.

Next, description will be made on information to be used to display the above-mentioned transition structure on the sub-screen 42.

FIG. 15 illustrates a table in which the screen transition information is written, and the table is created by the screen information recording section 23, is stored in the recording section 30, and is used by the screen transition structure creating section 24. The screen transition information is composed of elements such as a "Page_ID", "ID", "parent_ID", and "start_position". The "Page_ID" represents a page to which the screen transition information belongs. The "ID" is an identification number for each screen transition, and the each screen transition holds a "parent_ID" as an identification number of the screen transition of each branch source and the "start_position" as a branch position (a branch time having been counted since the starting point of time of the screen transition of the branch source) in the screen transition of the branch source.

Specifically, the first screen-transition in FIG. 3 to FIG. 14 is the screen transition of a branch source (the origin of branching); thus, the "parent_ID" of the screen transition whose "ID" is 0 is "ra" indicating itself, and the "start_position" is "0:00:00", which is the starting point of time of the screen transition of itself. Further, because the second screen-transition illustrated in FIG. 5 to FIG. 14 is the screen transition branched off from the first screen-transition, the "parent_ID" of the screen transition whose "ID" is "1" is "0" representing the first screen-transition, the "start_position" is the position (the time when the object 3' was added) indicated by the indication mark 45 of FIG. 4. Note that, although this is not illustrated in FIG. 3 to FIG. 14, the "parent_ID" of the screen transition whose "ID" is "2" is "1", and the "ID" shows the fact that the screen transition was further branched from the screen transition which had been branched off. Further, the "parent_ID" of the screen transition whose "ID" is "3" is "0", and the "ID" shows the fact that the screen transition was branched off from the first screen-transition at a position different from the position at which the screen transition whose "ID" is 1 was branched off.

FIG. 16 illustrates a table in which the detailed screen transition information is described, and the table is created by the screen information recording section 23, is stored in the recording section 30, and is used by the screen transition structure creating section 24. The detailed screen transition information is composed of elements such as an "ID", a "Time", "screen_data", and "memo_data". The ID is the identification number of the screen transition, and the identification number is used to associate the screen transition with the screen transition information of FIG. 15. The "Time" starts at the start point the screen transition and represents the time (for example, a series of time point at regular intervals, or a time when an event occurred) at which the screen data of the main screen 41 were obtained in that screen transition. The "screen_data" are the screen data of the main screen 41 obtained at the above-mentioned time.

The "memo_data" represent a content of a memorandum, if the memorandum was added by a user at the above-mentioned time.

Specifically, in the case of the screen transition (the first screen-transition illustrated in FIG. 3 to FIG. 14) whose "ID" is "0", the objects 1 to 4 have been created on the initial screen; thus, it is configured to store the screen data every time the object is created (an event occurs), five pieces of screen data of the screens at the time of the initial screen and when the objects 1 to 4 are created. Alternatively, it is configured to store the screen data at regular intervals, the screen data of the screens corresponding to the initial screen and being obtained at regular intervals are stored.

Alternatively, in the case of the transition screen (the second screen-transition illustrated in FIG. 5 to FIG. 14) whose "ID" is "1", because the objects 3' to 5' have been created on the initial screen. Therefore, if it is configured to store the screen data every time the object is created (an event occurs), the screen at the time of branching and the three screens when the objects 3' to 5' (three pieces of the screen data, in FIG. 4, because the object 3' was created at the time of the branch) are created are stored. Further, if it is configured to store the screen data at regular intervals similarly to the above-mentioned case, the screen at the time of branching and the screens corresponding to a series of time points at regular intervals are stored. In addition, as illustrated in FIG. 7, the memorandum 46 has been inserted at the time of creating the object 5'; thus, in the column of "memo_data" corresponding to the object 5' holds memo data.

Note that, in the present example, the second screen-transition is screen transition starting at the point of time of the branching; however, the screen transition of the branch source before the branching may be included (in other words, the state of creating the objects 1 and 2 with respect to the initial screen is included).

FIG. 17 illustrates the table in which the point of time (the position of the indication mark 45) when the screen currently displayed on the main screen 41 was created is described, and the table is created by the screen information recording section 23, is stored in the recording section 30, and used by the screen transition structure creating section 24. The current position information is composed of elements such as a "Page_ID", a "current_ID", and a "current_position". The "Page_ID" is a page to which the screen transition belongs, and the "Page_ID" is used to associate the screen transition with the screen transition information of FIG. 15. The "current_ID" is a number to be used to identify the screen transition in which the indication mark 45 is located, and the "current_ID" is used to associate the screen transition with the screen transition information of FIG. 16. The "current_position" represents the position of the indication mark 45 within the screen transition (in other words, the time based on the start time of the screen transition as a standard).

Specifically, in the example of FIG. 5, because the indication mark 45 has been located at the point of time of creating the object 5' in the second screen-transition whose "ID" is "1", the "Page_ID" is "0" representing the page to which the screen transition belongs, the "current_ID" is "1" identifying the screen transition, and the current_position" is the time (the time of the last line of the screen transition information whose "ID" is "1" in FIG. 16) when the object 5' was created.

FIG. 18 is an display example of the screen transition structure created by the screen transition structure creating section 24, based on the information described in FIG. 15 to FIG. 17, and the display example illustrates the case that the thumbnail images 44 are omitted, the main line 43, the branch line 43a, and the numbers for identifying the screen transition, and the time of branching off are displayed, similarly to FIG. 11. From FIG. 18, it can be seen that the screen transition whose "ID" is "3" and the screen transition (the second screen-transition of FIG. 5 to FIG. 14) whose "ID" is "1" are branched off from the screen transition (the first screen-transition of FIG. 3 to FIG. 14) whose "ID" is "0", and the screen transition whose "ID" is "2" is further branched off from the screen transition whose "ID" is "1".

Operations of the information display apparatus of the present example will be described below. The CPU develops on the RAM the display control program stored in the ROM and executes the display control program, thereby the display control program causes the CPU to perform processes illustrated in the flowcharts of FIG. 19 to FIG. 21. Note that, in the following description, assume that a process of displaying the main screen 41 in the display area of the display and operation section 10 and a process of displaying the sub-screen 42 have already been executed.

Process of Recording Screen Transition:

First, the process of recording screen transition will be described with reference to the flowchart in FIG. 19. The process of recording screen transition is performed at a series of points in time at regular intervals in the example; however, the process of recording screen transition may be performed every time an operation such as addition, movement, edition, enlargement/reduction, deletion, and the like with respect to an object is performed (every time an event occurs) on the main screen 41. The CPU of the processing section 20 can measure time, based on a clock frequency.

Under the condition that the main screen 41 is displayed in the display area, the screen information recording section 23 creates screen transition information and records the screen transition information into the recording section 30, at a series of points in time, where the screen transition information associates information for identifying the screen transition as a current display target, time starting at the start point of the identified screen transition, and screen data of the main screen 41 currently displayed in the display area (screen data of the main screen 41 displayed at the current time in the identified screen transition). Concretely, when a certain period has elapsed (or an event has occurred), the screen information recording section 23 acquires from the screen control section 22 information for identifying the currently displayed screen transition, an elapsed time since the start of the screen transition, and the screen data of the currently displayed main screen 41 (step S101), and crates or updates the screen transition information and the current position information, based on the obtained information, and then stores (records) the screen transition information and the current position information in the recording section 30 (step S102). Further, when receiving a user's operation to change the display of the main screen 41 under the condition that the main screen 41 is displayed based on a certain screen transition, the screen information recording section 23 may perform one of overwriting the screen transition information of the certain screen transition base on the change in the display of the main screen 41 and recording the change in the display of the main screen 41 as screen transition information of another screen transition.

Then, the screen control section 22 determines whether or not the screen transition structure is displayed on the sub-screen 42 (step S103), and if the screen transition structure is displayed, the screen control section 22 performs the display processing of the screen transition structure (step S104). The display processing of the screen transition structure will be described in detail later.

Process of Inputting Screen Operation:

Next, the process of inputting screen operation will be described with reference to the flowchart of FIGS. 20A and 20B. The process of inputting screen operation is performed every time the operation input is performed on the sub-screen 42.

The user operation interpreting section 21 determines, based on signals outputted from the display and operation section 10, whether the user's operation is an operation for newly displaying the screen transition structure (step S201). If the operation is for newly displaying the screen transition structure, the screen control section 22 performs the display processing of the screen transition structure (step S202). This display process of the screen transition structure will be described in detail later.

If the screen transition structure has been already displayed, the user operation interpreting section 21 determines whether the position of operation of the user's operation is on the screen transition structure (step S203). If the position of operation is not on the screen transition structure, another process will be performed (step S212). For example, if the position of operation is on the "MEMO" button, the user operation interpreting section 21 determines that an operation to input a memorandum as additional information and performs the processing of adding the memorandum. For concrete example, when receiving a user's operation to input a memorandum under the condition that an indication mark 45 is displayed on the main line 43 or the branch line 43a and that the main screen corresponding to the position indicated by the indication mark 45 is displayed, the user operation interpreting section 21 displays the inputted information around the position indicated by the indication mark 45 and stores the memorandum as information of screen transition information into recording section 30. If the position of operation is on the "COMPARISON" button, the process of setting the display mode of the main screen 41 to a comparison mode (double screen mode) is performed.

If the position of operation is on the screen transition structure (in other words, a slide operation to move the indication mark 45 on the main line 43 or the branch line 43a), the screen control section 22 defines information for identifying the screen transition and the time in the screen transition based on the position of the indication mark 45 (the end position of the movement of the indication mark 45), and communicates the information and the time to the screen transition structure creating section 24. The screen transition structure creating section 24 acquires the screen transition information (screen data) corresponding to the given information from recording section 30 and communicates the screen data to the screen control section 22 (step S204), and the screen control section 22 operates the display and operation section 10 to display the main screen 41, based on the given screen data (step S205). In other words, based on the screen transition information (screen data) corresponding to the position of the indication mark 45, the screen control section 22 reproduces the display of the main screen at the time point indicated by the indication mark 45.

Nest, the user operation interpreting section 21 determines whether the comparison mode has been set (step S206). If the comparison mode has been set, because the two indication marks 45 (on the main line 43 and the branch line 43a) have been located on the sub-screen 42, the screen control section 22 operates the display section 10a to display the two main screen 41 corresponding to the positions indicated by the indication marks 45 at the same time.

Concretely, the screen control section 22 defines the information for identifying the screen transition and the time in the screen transition from the position of the other indication mark 45 and communicates the information and the time to the screen transition structure creating section 24. The screen transition structure creating section 24 acquires the screen transition information (screen data) corresponding to the given information from the recording section 30 and informs the screen control section 22 of the screen data (step S207), and the screen control section 22 divides the display area of the main screen 41 into two areas, and displays in one area the main screen 41 based on the screen data given in step S204 and in the other area the main screen 41 based on the screen data given in step S207 (step S208).

If the comparison mode has not been set in step S206, the user operation interpreting section 21 determines whether the user's operation is an operation for moving the indication mark 45 in the direction perpendicular to the time axis (an vertical drag operation if the horizontal axis is the time axis) (step S209), and if the operation is the vertical drag operation, the screen information recording section 23 creates an "ID" for identifying the screen transition and updates the screen transition information (step S210). For example, when receiving a user's operation to move the indication mark 45 in the direction perpendicular to the main line 45 through the operation section 10b under the condition that the main screen 41 is displayed in the display area based on certain screen transition information, the screen information recording section 23 determines that there is created a new screen transition, creates "ID" for identifying the new screen transition, and records the change in the display of the main screen 41 starting at the point when the operation has been detected, as screen transition information corresponding to the created "ID".

Then screen information recording section 23 reads the current position information from the recording section 30, and updates the current position information, based on the current position of the indication mark 45 (two indication marks if the comparison mode has been set) which has been moved by the slide operation and the vertical drag operation, and then stores the current position information in the recording section 30.

Display Processing of Screen Transition Structure:

Then, the display processing of the screen transition structure will be described with reference to the flowchart of FIG. 21. This display processing of the screen transition structure is the process to be performed in step S104 of the process of recording screen transition of FIG. 19 or the process to be performed in step S202 of the process of inputting screen operation of FIG. 20A.

First, the screen transition structure creating section 24 acquires the screen transition information from the recording section 30 to arrange the main line 43, the branch line 43a, and the thumbnail images 44 in the screen transition structure based on the screen data (step S301), and then acquires the current position information from the recording section 30 to arrange the indication mark 45 at the position specified by the current position information in the screen transition structure (step S302). Next, the screen transition structure creating section 24 determines whether the comparison mode has been set (step S303), and if the comparison mode has been set, the screen transition structure creating section 24 arranges another indication mark 45 at the position in the screen transition structure specified by the current position information (step S304). Next, if the screen transition information includes additional information such as memo data, the screen transition structure creating section 24 arranges the memorandum at the position specified by the screen transition information (for example, around the position indicated by the indication mark 45 on the main line 43 or the branch lien 43a) (step S305). Then, the screen transition structure creating section 24 communicates the generated screen transition structure to the screen control section 22, and the screen control section 22 operates the display and operation section 10 to display the given screen transition structure in the sub-screen 42 (step S306).

As described above, in the information display apparatus of the present example, in addition to the main screen 41 for showing an object or objects there on, the sub-screen 42 is provided to show the screen transition structure (screen transition diagram) which represents the screen transition of the main screen 41, and the main line 43 is displayed on the sub-screen 42 to allow users to recognize the screen transitions in time series, and the branch line 43a is displayed to allow users to recognize the branching of the screen transition if the screen transition is branched; thus, users can easily understand how the main screen 41 has been changed (what kind of operation has been performed) by a glance at the sub-screen 42. Further, in the information display apparatus of the present example, only by moving the indication mark 45 to an arbitrary position on the main line 43 or the branch line 43a, users can reproduce the main screen 41 at that point of time; thus, the users can understand what kind of main screen 41 was displayed (what kind of operation was performed) by a simple operation.

Note that the present invention is not limited to the above-described embodiments and examples, and the configuration and the control can be modified as needed without departing from the spirit of the present invention.

For example, in the above example, the description was made on an assumption that the information display apparatus is an electronic whiteboard; however, the present invention can be similarly applied to a tablet terminal and the like. In that case, there can be displayed on the screen a photo image captured with a camera function provided on the tablet terminal, an image obtained through a communication network, and the like instead of or in addition to handwritten characters or figures. For example, the screen transition of serially performed operations of addition, movement, processing, enlargement/reduction, and deletion of these images can be displayed on the sub-screen 42.

Further, the embodiments and examples can be similarly applied to a computing device in which the display section 10a and the operation section 10b (mouse, keyboard, and the like) are separated. In that case, there can be displayed on the sub-screen 42 the screen transition caused when the following operations were serially performed, where the operations include addition, movement, and enlargement/reduction of the working screen (window) of one of various applications by using the operation device such as a mouse and a keyboard, and edition of information displayed on the working screen performed by using functions of an application.

The invention claimed is:

1. An information display apparatus comprising:
a display section configured to display an object thereon;
an operation section configured to operate the object;
a recording section; and
a processing section configured to
control the display section and the operation section, and
operate the display section to display a first screen showing the object and a second screen showing a screen transition diagram, into a display area of the display section, the screen transition diagram representing change in display of the first screen arid showing a first figure representing a first screen-transition and a second figure branched from the first figure and representing a second screen-transition to be recognizable, the first screen-transition representing a change in display of the first screen, the second screen-transition representing another change in display of the first screen starting at a certain point in the first screen-transition,
on the first screen being displayed in the display area based on a screen transition being one of the first screen-transition and the second screen-transition, create screen transition information of the screen transition and record the screen transition information into the recording section, at a series of points in time, the screen transition information associating information for identifying the screen transition, a time in the screen transition starting at a starting point of the screen transition, and screen data of the first screen at the time in the screen transition, with each other, and
determine:
a user command to return to a previous point in time in the first screen-transition, and
a first user choice regarding whether to overwrite the screen transition information of the first screen-transition that follows the previous point in time and a second user choice regarding whether to maintain the screen transition information of the first screen-transition that follows the previous point in time, the first user choice and the second user choice being received using the screen transition diagram on the second screen.

2. The information display apparatus of claim 1, wherein the processing section is configured to,
operate the display section to display, in the screen transition diagram, a main line representing a time course of the first screen-transition, a branch line representing a time course of the second screen-transition, and an indication mark for indicating a point on the main line or the branch line, and
in response to receiving an operation to move the indication mark along the main line or the branch line through the operation section, acquire the screen transition information corresponding to an end position of movement of the indication mark, from the recording section, to reproduce display of the first screen in the display area by using the screen data of the acquired screen transition information.

3. The information display apparatus of claim 2,
wherein the first user choice is determined by an operation to make change in display of the first screen through the operation section under a condition that the first screen is displayed in the display area based on the screen data at the certain point of the first screen-transition by moving the indication mark along the main line.

4. The information display apparatus of claim 2,
wherein the processing section is configured to in response to receiving an operation to move the indication mark in a direction perpendicular to the main line through the operation section under a condition that the first screen is displayed in the display area based on the first screen-transition, record the screen transition information of the second screen-transition based on change in display of the first screen starting at time of receiving the operation to move the indication mark.

5. The information display apparatus of claim 2,
wherein the processing section is configured to
operate the display section to display the indication mark on each of the main line and the branch line, and
operate the display section to display the first screen corresponding to a point indicated by the indication mark on the main line and the first screen corresponding to a point indicated by the indication mark on the branch line, together in the display area.

6. The information display apparatus of claim 2,
wherein the processing section is configured to
in response to receiving an operation to input additional information through the operation section under a condition that the first screen corresponding to a point indicated by the indication mark on the main line or the branch line is displayed in the display area, operate the display section to display the additional information around the point indicated by the indication mark on the one of the main line and the branch line.

7. The information display apparatus of claim 2,
wherein the processing section is configured to operate the display section to further display an image showing display of the first screen corresponding to a certain point on one of the main line and the branch line, around the certain point on the one of the main line and the branch line.

8. The information display apparatus of claim 2, wherein the first user choice and the second user choice are determined based on a location of the end position of movement of the indication mark relative to the main line.

9. The information display apparatus of claim 1,
wherein the processing section is configured to,
on receiving an operation to make change in display of the first screen through the operation section under a condition that the first screen is displayed in the display area based on the first screen-transition, determine whether to overwrite the screen transition information of the first screen-transition based on the change in display of the first screen or to record the screen transition information of the second screen-transition based on the change in display of the first screen, on the basis of a user's operation on the screen transition diagram.

10. A non-transitory computer-readable storage medium storing a display control program to be executed in an image forming apparatus including a display section configured to display an object and an operation section configured to operate the object, the display control program, when being executed by a processor of the image forming apparatus, causing the processor to perform processes comprising:
operating the display section to display a first screen sho g the object, into a display area of the display section; and
operating the display section to display a second screen showing a screen transition diagram representing change in display of the first screen, into the display area,
wherein the operating the display section to display the second screen includes operating the display section to display in the screen transition diagram a first figure representing a first screen-transition and a second figure branched from the first figure and representing a second screen-transition to be recognizable, the first screen-transition representing a change in display of the first screen, the second screen-transition representing another change in display of the first screen starting at a certain point in the first screen-transition,
on the first screen being displayed in the display area based on a screen transition being one of the first screen-transition and the second screen-transition, creating screen transition information of the screen transition and recording the screen transition information into the recording section, at a series of points in time, the screen transition information associating information for identifying the screen transition, a time in the screen transition starting at a starting point of the screen transition, and screen data of the first screen at the time in the screen transition, with each other, and
determining:
a user command to return to a previous point in time in the first screen-transition, and
a first user choice regarding whether to overwrite the screen transition information of the first screen-transition that follows the previous point in time and a second user choice regarding whether to maintain the screen transition information of the first screen-transition that follows the previous point in time, the first user choice and the second user choice being received using the screen transition diagram on the second screen.

11. The non-transitory computer-readable storage medium of claim 10,
wherein the operating the display section to display the second screen includes operating the display section to display, in the screen transition diagram, a main line representing a time course of the first screen-transition, a branch line representing a time course of the second screen-transition, and an indication mark for indicating a point on the main line or the branch line, and
the operating the display section to display the first screen includes, in response to receiving an operation to move the indication mark along the main line or the branch line through the operation section,
acquiring the screen transition information corresponding to an end position of movement of the indication mark, from the recording section, and
reproducing display of the first screen in the display area by using the screen data of the acquired screen transition information.

12. The non-transitory computer-readable storage medium of claim 11,
wherein the first user choice is determined by an operation to make change in display of the first screen through the operation section under a condition that the first screen is displayed in the display area based on the screen data at a certain point of the first screen-transition by moving the indication mark along the main line.

13. The non-transitory computer-readable storage medium of claim 11,
wherein the recording the screen transition information includes, in response to receiving an operation to move the indication mark in a direction perpendicular to the main line through the operation section under a condition that the first screen is displayed in the display area based on the first screen-transition, recording the screen transition information of the second screen-transition based on change in display of the first screen starting at time of receiving the operation to move the indication mark.

14. The non-transitory computer-readable storage medium of claim 11, wherein the operating the display section to display the second screen includes operating the display section to display the indication mark on each of the main line and the branch line, and the operating the display section to display the first screen includes operating the display section to display the first screen corresponding to a point indicated by the indication mark on the main line and the first screen corresponding to a point indicated by the indication mark on the branch line, together in the display area.

15. The non-transitory computer-readable storage medium of claim 11, wherein the operating the display section to display the second screen includes, in response to receiving an operation to input additional information through the operation section under a condition that the first screen corresponding to a point indicated by the indication mark on the main line or the branch line is displayed in the display area, operating the display section to display the additional information around the point indicated by the indication mark on the one of the main line and the branch line.

16. The non-transitory computer-readable storage medium of claim 11, wherein the operating the display section to display the second screen includes operating the display section to further display an image showing display of the first screen corresponding to a certain point on one of the main line and the branch line, around the certain point on the one of the main line and the branch line.

17. The non-transitory computer-readable storage medium of claim 11, wherein the first user choice and the second user choice are determined based on a location of the end position of movement of the indication mark relative to the main line.

18. The non-transitory computer-readable storage medium of claim 10, wherein on receiving an operation to make change in display of the first screen through the operation section under a condition that the first screen is displayed in the display area based on the first screen-transition, determining whether to overwrite the screen transition information of the first screen-transition based on the change in display of the first screen or to record the screen transition information of the second screen-transition based on the change in display of the first screen, on the basis of a user's operation on the screen transition diagram.

19. A display control method of an image display apparatus including a display section configured to display an object and an operation section to operate the object, the display control method comprising:

operating the display section to display a first screen showing the object, into a display area of the display section; and operating the display section to display a second screen showing a screen transition diagram representing change in display of the first screen, into the display area, wherein the operating the display section to display the second screen includes operating the display section to display in the screen transition diagram a first figure representing a first screen-transition and a second figure branched from the first figure and representing a second screen-transition to be recognizable, the first screen-transition representing a change in display of the first screen, the second screen-transition representing another change in display of the first screen starting at a certain point in the first screen-transition, on the first screen being displayed in the display area based on a screen transition being one of the first screen-transition and the second screen-transition, creating screen transition information of the screen transition and recording the screen transition information into the recording section, at a series of points in time, the screen transition information associating information for identifying the screen transition, a time in the screen transition starting at a starting point of the screen transition, and screen data of the first screen at the time in the screen transition, with each other, and determining:
a user command to return to a previous point in time in the first screen-transition, and
a first user choice regarding whether to overwrite the screen transition information of the first screen-transition that follows the previous point in time and a second user choice regarding whether to maintain the screen transition information of the first screen-transition that follows the previous point in time, the user choice being received using the screen transition diagram on the second screen.

20. The display control method of claim 19,
wherein the operating the display section to display the second screen includes
operating the display section to display, in the screen transition diagram, a main line representing a time course of the first screen-transition, a branch line representing a time course of the second screen-transition, and an indication mark for indicating a point on the main line or the branch line, and the operating the display section to display the first screen includes, in response to receiving an operation to move the indication mark along the main line or the branch line through the operation section,
acquiring the screen transition information corresponding to an end position of movement of the indication mark, from the recording section, and
reproducing display of the first screen in the display area by using the screen data of the acquired screen transition information.

21. The display control method of claim 20,
wherein the first user choice is determined by an operation to make change in display of the first screen through the operation section under a condition that the first screen is displayed in the display area based on the screen data at a certain point of the first screen-transition by moving the indication mark along the main line.

22. The display control method of claim 20,
wherein the recording the screen transition information includes, in response to receiving an operation to move the indication mark in a direction perpendicular to the main line through the operation section under a condition that the first screen is displayed in the display area based on the first screen-transition, recording the screen transition information of the second screen-transition based on change in display of the first screen starting at time of receiving the operation to move the indication mark.

23. The display control method of claim 20,
wherein the operating the display section to display the second screen includes operating the display section to display the indication mark on each of the main line and the branch line, and the operating the display section to display the first screen includes operating the display section to display the first screen corresponding to a point indicated by the indication mark on the main line and the first screen corresponding to a point indicated by the indication mark on the branch line, together in the display area.

24. The display control method of claim 20,
wherein the operating the display section to display the second screen includes, in response to receiving an operation to input additional information through the operation section under a condition that the first screen corresponding to a point indicated by the indication mark on the main line or the branch line is displayed in the display area, operating the display section to display the additional information around the point indicated by the indication mark on the one of the main line and the branch line.

25. The display control method of claim 20,
wherein the operating the display section to display the second screen includes operating the display section to further display an image showing display of the first screen corresponding to a certain point on one of the main line and the branch line, around the certain point on the one of the main line and the branch line.

26. The display control method of claim 19,
wherein on receiving an operation to make change in display of the first screen through the operation section under a condition that the first screen is displayed in the display area based on the first screen-transition, determining whether to overwrite the screen transition information of the first screen-transition based on the change in display of the first screen or to record the screen transition information of the second screen-transition based on the change in display of the first screen, on the basis of a user's operation on the screen transition diagram.

27. The display control method of claim 19, wherein the first user choice and the second user choice are determined based on a location of the end position of movement of the indication mark relative to the main line.

28. An information display apparatus comprising:
a display section having a display screen;
an operation section configured to receive an operation to display an object on a first screen of the display screen of the display section;
a recording section configured to store transition information of the display screen, the transition information representing information of a change in a display of the display screen in response to operations received on the operation section at a series of points in time;
an indication section configured to, on a basis of the transition information stored in the recording section, reproduce on the display screen the display at a certain point in time among a series of points in time;
a first control section configured to, when an object is added onto the screen at the certain point in time reproduced by the indication section, in response to an operation received on the operation section, delete the transition information at a point or points in time after the certain point in time from the transition information stored in the recording section, and record transition information of the screen on which the object is added, into the recording section at another series of points in time starting at the certain point in time;
a second control section configured to, when an object is added onto the screen at the certain point in time reproduced by the indication section, in response to an operation received on the operation section, maintain the transition information of the screen at a point or points in time after the certain point in time stored in the recording section, and record transition information of the screen on which the object is added, into the recording section at another series of points in time starting at the certain point in time; and
a choosing section configured to allow a user to provide:
an indication of the certain point in time, and
a first choice regarding whether to record the transition information on a basis of operations of the first control section, and a second coice regarding whether to record the transition information on a basis of operations of the second control section, the indication of the certain point in time, the first choice, and the second choice being received using a screen transition diagram on a second screen of the display screen.

29. The information display apparatus of claim 28,
wherein the display section displays the screen transition diagram on the second screen based on the transition information recorded on the basis of operations of the second control section.

30. The information display apparatus of claim 28, the indication section is configured to,
operate the display section to display, in a screen transition diagram, a main line representing a time course of the first screen-transition, a branch line representing a time course of a second screen-transition, and an indication mark for indicating a point on the main line or the branch line,
in response to receiving an operation to move the indication mark along the main line or the branch line through the operation section, acquire the screen transition information corresponding to an end position of movement of the indication mark, from the recording section, to reproduce display of the first screen in the display area by using the screen data of the acquired screen transition information, and
the choosing section determines the first user choice and the second user choice based on a location of the end position of movement of the indication mark relative to the main line.

* * * * *